US012073353B2

(12) United States Patent
Vivas Suarez et al.

(10) Patent No.: US 12,073,353 B2
(45) Date of Patent: Aug. 27, 2024

(54) ARTICLE TRACKING SYSTEM

(71) Applicant: Core Transport Technologies NZ Limited, Nelson (NZ)

(72) Inventors: Maria Veronica Vivas Suarez, Orlando, FL (US); Samuel Gene Bower Wilkinson, Richmond (NZ); Timothy Martin Craig, Nelson (NZ); Annette Joan Schleiss, Nelson (NZ); Ian Norton Craig, Nelson (NZ); David Clive Hutchinson, Richmond (NZ); Dylan Alister Winter, Nelson (NZ); Jose Alejandro Isea Alvarez, Orlando, FL (US); Craig David Shannon, Auckland (NZ); Jason Narayan, Auckland (NZ); Daniel William Willdridge, Auckland (NZ)

(73) Assignee: CORE TRANSPORT TECHNOLOGIES NZ LTD, Nelson (NZ)

( * ) Notice: Subject to any disclaimer, the term of this patent is extended or adjusted under 35 U.S.C. 154(b) by 1500 days.

(21) Appl. No.: 16/303,429

(22) PCT Filed: May 19, 2017

(86) PCT No.: PCT/NZ2017/050067
§ 371 (c)(1),
(2) Date: Nov. 20, 2018

(87) PCT Pub. No.: WO2017/200398
PCT Pub. Date: Nov. 23, 2017

(65) Prior Publication Data
US 2019/0362304 A1    Nov. 28, 2019

(30) Foreign Application Priority Data
May 20, 2016    (AU) .................................. 2016901892

(51) Int. Cl.
*G06Q 10/0833* (2023.01)
*G06K 7/00* (2006.01)
(Continued)

(52) U.S. Cl.
CPC .......... *G06Q 10/0833* (2013.01); *G06K 7/00* (2013.01); *G06K 19/0723* (2013.01); *G06K 19/073* (2013.01)

(58) Field of Classification Search
CPC .. G06Q 10/0833; G06K 7/00; G06K 19/0723; G06K 19/073
See application file for complete search history.

(56) References Cited

U.S. PATENT DOCUMENTS 10,043,046 B1 *   8/2018   Robshaw ........... G06K 7/10009
10,719,671 B1 *   7/2020   Robshaw ............. H04B 5/0062
(Continued)

FOREIGN PATENT DOCUMENTS

| KR | 20150137885 | * 12/2015 |
| WO | 2000/021031 | 4/2000 |
| WO | 2015/138431 | 9/2015 |

OTHER PUBLICATIONS

Bartneck et al., "Optimizing Processes with RFID and Auto ID-Fundamentals, Problems and Solutions, Example Applications," Apr. 20, 2009, Publicis Publishing, XP055641946, ISBN: 978-3-89578-330-2, pp. ToC, Ch02-Ch06, Ch09-Ch12, Ch16, Indexes.
(Continued)

*Primary Examiner* — Sonji N Johnson
(74) *Attorney, Agent, or Firm* — McDonnell Boehnen Hulbert & Berghoff LLP

(57) ABSTRACT

An article tracking system including: a plurality of tags, each tag being attached to a respective article in use and including: a power supply; a tag transceiver that transmits or receives messages; and a tag processing device; a number of
(Continued)

tag readers, each tag reader including: at least one reader transceiver that transmits or receives messages; and, a reader processing device in communication with the at least one tag reader; and, at least one processing system in communication with the number of tag readers, and wherein in use each tag reader: generates a message; and, transmits the message to one or more tags within an operating range of the reader, wherein ones of the one or more tags in a passive operating mode are responsive to the message to: receive the message; selectively change a tag operating mode; and, if the message is a broadcast message, transmit a tag message at least partially indicative of an identity of the tag; receives any tag messages; generates location data at least partially indicative of a location of at least one tag using the identity of the at least one tag from any received tag messages; and, provides the location data to the at least one processing system, the at least one processing device being responsive to the location data to track the location of articles.

20 Claims, 20 Drawing Sheets

(51) Int. Cl.
*G06K 19/07* (2006.01)
*G06K 19/073* (2006.01)

(56) References Cited

U.S. PATENT DOCUMENTS

| | | | |
|---|---|---|---|
| 2005/0095573 A1 | 5/2005 | Overhultz et al. | |
| 2006/0202804 A1* | 9/2006 | Vijay-Pillai | G06K 19/0705 340/10.33 |
| 2006/0255947 A1 | 11/2006 | Redler et al. | |
| 2008/0001748 A1* | 1/2008 | Childress | G06K 17/00 700/214 |
| 2008/0186136 A1* | 8/2008 | Raphaeli | G01S 5/0215 340/10.1 |
| 2008/0231449 A1 | 9/2008 | Moshfeghi | |
| 2009/0085723 A1 | 4/2009 | Traub et al. | |
| 2009/0231138 A1 | 9/2009 | Lai et al. | |
| 2010/0277286 A1* | 11/2010 | Burkart | G06K 19/0701 340/10.34 |
| 2010/0288843 A1 | 11/2010 | Arnesen et al. | |
| 2011/0298591 A1* | 12/2011 | Mickle | G06K 19/0723 340/10.33 |
| 2012/0242453 A1 | 9/2012 | Delgado et al. | |
| 2012/0313761 A1* | 12/2012 | Rolin | G06Q 30/0241 340/10.5 |
| 2013/0010700 A1 | 1/2013 | Twitchell, Jr. | |
| 2013/0265155 A1 | 10/2013 | Wible et al. | |
| 2014/0266625 A1* | 9/2014 | Merlin | H04W 52/0229 340/10.1 |
| 2015/0373521 A1 | 12/2015 | Olesen et al. | |

OTHER PUBLICATIONS

Bolić et al., "RFID Systems: Research Trends and Challenges," Aug. 31, 2010, Wiley, SP055658664, ISBN: 978-0-470-74602-8, pp. ToCh01-Ch02, Ch06, Ch18.

Hansen et al., "RFID for the Optimization of Business Processes," Apr. 14, 2008, Wiley, XP055441387, ISBN: 978-0-470-72422-4.

Lehpamer et al., "RFID Design Principles", Dec. 31, 2007 (Dec. 31, 2007), Artech House, XP055219663, ISBN:978-1-59693-194-7 pp. 0-293, (pp. 55-60, 153-163, 174-175 and 79-99).

Ahson et al., "RFID handbook: applications, technology, security, and privacy", Mar. 18, 2008 (Mar. 18, 2008), CRC Press, Boca Raton, Fla. [u.a.], XP055623582, ISBN: 978-1-4200-5499-6 pp. ToC, Ch01-Ch22, Ch24, Ch28, Ind, (pp. 17, 29, 48, 60 and 213-227).

Wikipedia: "Radio-frequency identification", internet article, May 17, 2016 (May 17, 2016), XP055623588, Retrieved from the Internet: URL:https://en.wikipedia.org/w/index.php?title=Radio-frequency_identification&oldid=720630352 (retrieved on Sep. 18, 2019), 14 pages.

Argenox Technologies: "Nordic Semi Announces nRF52 Series of BLE Devices", Internet Article, Apr. 7, 2016 (Apr. 7, 2016), SP055623599, Retrieved from the Internet: URL:https://web.archive.org/web/20160407142947/https://www.argenox.com/blog/nordic-announces-new-line-of-cortex-m4-ble-socs/ (retrieved on Sep. 18, 2019), 5 pages.

Chinese Patent Office, First Office Action and Search Report dated Nov. 24, 2022, issued in connection with Chinese Patent Application No. 201780044634.9, 33 pages.

* cited by examiner

Fig. 11C

ARTICLE TRACKING SYSTEM

BACKGROUND OF THE INVENTION

The present invention relates to an article tracking system and associated tracking method, and in particular an article tracking system utilising wireless tags attached to articles being tracked.

Description of the Prior Art

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

It is well known that there is a need to be able to track articles. Whilst this arises in many circumstances, this is particularly prevalent in industries in which large volumes of articles, such as luggage, or parcels are being transported. In particular, there is often a need to be able to pinpoint the location of individual articles, from amongst many other similar articles, to thereby ensure each article is successfully transported to an intended destination.

For a number of years, existing solutions have focused on the use of machine readable coded data, such barcodes printed onto the article or associated packaging, or the use of an associated RFID tag. However, such approaches suffer from a number of drawbacks.

For example, the range of such systems is typically limited, meaning articles must pass relatively close to an associated reader to allow these to be detected. As a result, large facilities, such as transit centres, where articles are sorted for routing, typically require a large number of readers, and often require that articles are diverted past the readers, leading to bottlenecks in the sorting process. Additionally, once out of the immediate vicinity of the reader, the articles are no longer tracked, meaning they are easily lost or intentionally removed.

This in turn leads to a number of logistical problems for entities involved in transporting articles, such as transportation companies and carriers. For example, this can lead to fraud, with individuals involved in handling articles being able to remove these from the transportation network without the location at which this occurred being easy to identify. Technologies such as barcodes and RFID can be easy to defraud, for example by copying barcodes, or spoofing RFID tags.

Consequently, there are significant additional costs arising, including due to the inherent constraints in detecting article location using RFID or barcodes, and in accounting for losses due to fraud or inadvertent routing of articles.

SUMMARY OF THE PRESENT INVENTION

In one broad form an aspect of the present invention seeks to provide an article tracking system including: a plurality of tags, each tag being attached to a respective article in use and including: a power supply; a tag transceiver that transmits or receives messages; and a tag processing device; a number of tag readers, each tag reader including: at least one reader transceiver that transmits or receives messages; and, a reader processing device in communication with the at least one tag reader; and, at least one processing system in communication with the number of tag readers, and wherein in use each tag reader: generates a message; and, transmits the message to one or more tags within an operating range of the reader, wherein ones of the one or more tags in a passive operating mode are responsive to the message to: receive the message; selectively change a tag operating mode; and, if the message is a broadcast message, transmit a tag message at least partially indicative of an identity of the tag; receives any tag messages; generates location data at least partially indicative of a location of at least one tag using the identity of the at least one tag from any received tag messages; and, provides the location data to the at least one processing system, the at least one processing device being responsive to the location data to track the location of articles.

In one embodiment in the passive operating mode the tag processing device does not transmit messages.

In one embodiment in response to a broadcast message received from the tag reader, the tag processing device: enters an active operating mode; and, transmits the tag message.

In one embodiment the tag processing device: receives a sleep message from the reader; and, enters a sleep operating mode for a defined time period in response to receiving the sleep message, wherein in the sleep operating mode the tag processing device at least one of: does not respond to messages; and, does not receive messages.

In one embodiment the sleep message is generated by the reader in response to receipt of the tag message.

In one embodiment in response to a power message, the tag processing device enters a power off operating mode by deactivating the power supply.

In one embodiment the tag message includes: a tag identifier indicative of the tag identity; and, at least one of a power supply indicator indicative of a power supply status; and a temperature indicator indicative of the maximum and minimum temperature to which the tag has been exposed between interactions with a reader.

In one embodiment the tag transceiver is a Bluetooth transceiver.

In one embodiment the tag is labelled with information including at least one of: machine readable coded data indicative of a tag identifier; coded data indicative of the identity of the tag; and, visible markings indicative of an identity of the tag.

In one embodiment the tag further includes a passive RFID tag.

In one embodiment the tag includes: a base; a cover attached to the base to define an internal cavity containing tag components; and, bolts secured to opposing ends of the base to allow the tag to be coupled to a rail mounted on an unit loading device.

In one embodiment the base includes a flat laminar metal plate bent to form a baselip extending at least part way around a perimeter of the base; and the cover includes a cover body that when coupled to the base defines a cavity that contains tag components, the cover body including a tongue extending laterally around at least part of a perimeter of the cover body that engages with the base lip to secure the cover to the base.

In one embodiment apertures extend perpendicularly through the base lip and tongue at opposing ends of the plate to define bolt openings adapted to receive the bolts.

In one embodiment the cover is at least one of: shaped to deflect impacts; and, made from at least one of: a plastic; and, a Polycarbonate/Polybutyleneterephthalate mix.

In one embodiment the tag includes a circuit board supporting electronic components and a battery housing, the battery housing including one or more recesses for receiving batteries and a ridged lip extending laterally outwardly from a lower edge of the battery housing body that sits in a recess in an underside face of the cover to thereby provide sealing engagement.

In one embodiment the reader processing device causes the at least one reader transceiver to transmit at least one of: a broadcast message to cause the tag to enter an active operating mode; a sleep message to cause the tag to enter a sleep operating mode; and, a power message to cause the tag to enter a power off operating mode.

In one embodiment the at least one reader transceiver transmits the broadcast message to any tags within an operating range of the reader, a tag processing device being responsive to the broadcast message to transmit the tag message.

In one embodiment the at least one reader transceiver: receives a tag message; determines an identity of the tag from the tag message; and, provides a reader message to the reader processing device, the reader message being indicative of the identity of the tag, the reader processing device being responsive to the reader message to cause the at least one reader transceiver to generate at least one of a sleep message and a power message in accordance with the identity of the tag.

In one embodiment the reader includes a plurality of reader transceivers that transmit or receive messages in parallel.

In one embodiment the reader processing device generates commands to cause the at least one reader transceiver to generate messages.

In one embodiment the reader processing device provides location data to the at least one processing system via a cellular communications network.

In one embodiment the location data includes an indication of: a reader identifier indicative of an identity of the reader; and, a tag identifier indicative of an identify of the tag, and wherein the processing system: determines a reader location using the reader identifier; and, determines an article identifier indicative of an identity of the article using the tag identifier and association data, the association data being indicative of an association between the article identifier and the tag identifier.

In one embodiment the at least one processing system: receives an indication of an article identifier and a tag identifier during a registration process; and, creates the association data using the received indication.

In one embodiment at least one of the article identifier and tag identifier are determined by a scanner that scans machine readable coded data provided on at least one of the article and the tag.

In one embodiment the at least one processing system at least one of: stores tracking data including an indication of the article location; and, generates a representation including an indication of a location of the article.

In one embodiment the representation includes at least one of: a map showing a location of the article; and, one of a number of visual indicia, the visual indicia being selected at least partially in accordance with the location.

In one embodiment the tag readers are provided at transit locations within a transport network.

In one broad form an aspect of the present invention seeks to provide an article tracking system including at least one tracking tag attached to an article in use, the at least one tracking tag including: a power supply; a tag transceiver that transmits or receives messages; and a tag processing device that: in a passive operating mode, receives messages from a tag reader; and, in accordance with a received message, at least one of: changes a tag operating mode; and, generates a tag message for transmission to the reader, the tag message being at least partially indicative of an identity of the tag and being used in determining a location of the article.

In one embodiment in the passive operating mode the tag processing device does not transmit messages.

In one embodiment in response to a broadcast message received from the tag reader, the tag processing device: enters an active operating mode; and, transmits the tag message.

In one embodiment the tag processing device: receives a sleep message from the reader; and, enters a sleep operating mode for a defined time period in response to receiving the sleep message, wherein in the sleep operating mode the tag processing device at least one of: does not respond to messages; and, does not receive messages.

In one embodiment the sleep message is generated by the reader in response to receipt of the tag message.

In one embodiment in response to a power message, the tag processing device enters a power off operating mode by deactivating the power supply.

In one embodiment the tag message includes: a tag identifier indicative of the tag identity; and, at least one of a power supply indicator indicative of a power supply status; and a temperature indicator indicative of the maximum and minimum temperature to which the tag has been exposed between interactions with a reader.

In one embodiment the tag transceiver is a Bluetooth transceiver.

In one embodiment the tag is labelled with information including at least one of: machine readable coded data indicative of a tag identifier; coded data indicative of the identity of the tag; and, visible markings indicative of an identity of the tag.

In one embodiment the tag further includes a passive RFID tag.

In one embodiment the tag includes: a base; a cover attached to the base to define an internal cavity containing tag components; and, bolts secured to opposing ends of the base to allow the tag to be coupled to a rail mounted on an unit loading device.

In one embodiment the base includes a flat laminar metal plate bent to form a baselip extending at least part way around a perimeter of the base; and the cover includes a cover body that when coupled to the base defines a cavity that contains tag components, the cover body including a tongue extending laterally around at least part of a perimeter of the cover body that engages with the base lip to secure the cover to the base.

In one embodiment apertures extend perpendicularly through the base lip and tongue at opposing ends of the plate to define bolt openings adapted to receive the bolts.

In one embodiment the cover is at least one of: shaped to deflect impacts; and, made from at least one of: a plastic; and, a Polycarbonate/Polybutyleneterephthalate mix.

In one embodiment the tag includes a circuit board supporting electronic components and a battery housing, the battery housing including one or more recesses for receiving batteries and a ridged lip extending laterally outwardly from a lower edge of the battery housing body that sits in a recess in an underside face of the cover to thereby provide sealing engagement.

In one broad form an aspect of the present invention seeks to provide an article tracking system including at least one tracking tag attached to an article in use, and a reader including: at least one reader transceiver that transmits or receives messages; and, a reader processing device, wherein the reader processing device and the at least one reader transceiver communicate to: generate a broadcast message for transmission to a tag; and, receive a tag message from the tag, the tag message being at least partially indicative of an identity of the tag and being used in determining a location of the article.

In one embodiment the reader processing device causes the at least one reader transceiver to transmit at least one of: a broadcast message to cause the tag to enter an active operating mode; a sleep message to cause the tag to enter a sleep operating mode; and, a power message to cause the tag to enter a power off operating mode.

In one embodiment the at least one reader transceiver transmits the broadcast message to any tags within an operating range of the reader, a tag processing device being responsive to the broadcast message to transmit the tag message.

In one embodiment the at least one reader transceiver receives the tag message; determines an identity of the tag from the tag message; and, provides a reader message to the reader processing device, the reader messages being indicative of the identity of the tag, the reader processing device being responsive to the reader message to cause the at least one reader transceiver to generate at least one of a sleep message and a power message in accordance with the identity of the tag.

In one embodiment the reader includes a plurality of reader transceivers that transmit or receive messages in parallel.

In one embodiment the reader processing device provides location data to a processing system, the location data being at least partially indicative of a location of the tag.

In one embodiment the location data includes an indication of: a reader identifier indicative of an identity of the reader; and, a tag identifier indicative of an identify of the tag.

In one embodiment the reader processing device provides location data to the processing system via a cellular communications network.

In one embodiment the reader processing device generates commands to cause the at least one reader transceiver to generate messages.

In one broad form an aspect of the present invention seeks to provide an article tracking system including: a plurality of tracking tags, each tag being attached to an article in use; a number of readers that: communicate with tracking tags to determine an identity of each tag; and, generate location data at least partially indicative of a location of each tag; at least one processing system in communication with the number of readers to: determine the location data; and, track the location of articles using the location data.

In one embodiment the location data includes an indication of: a reader identifier indicative of an identity of the reader; and, a tag identifier indicative of an identify of the tag, and wherein the processing system: determines a reader location using the reader identifier; and, determines an article identifier indicative of an identity of the article using the tag identifier and association data, the association data being indicative of an association between the article identifier and the tag identifier.

In one embodiment the processing system: receives an indication of an article identifier and a tag identifier during a registration process; and, creates the association data using the received indication.

In one embodiment at least one of the article identifier and tag identifier are determined by a scanner that scans machine readable coded data provided on at least one of the article and the tag.

In one embodiment the processing system at least one of: stores tracking data including an indication of the article location; and, generates a representation including an indication of a location of the article.

In one embodiment the representation includes at least one of: a map showing a location of the article; and, one of a number of visual indicia, the visual indicia being selected at least partially in accordance with the location.

In one embodiment the readers are provided at transit locations within a transport network.

In one broad form an aspect of the present invention seeks to provide an article tracking method using at least one tracking tag attached to an article in use, the method including in a tag processing device of the tag: in a passive operating mode, receiving messages from a tag reader; and, in accordance with a received message, at least one of: changing a tag operating mode; and, generating a tag message for transmission to the reader, the tag message being at least partially indicative of an identity of the tag and being used in determining a location of the article.

In one broad form an aspect of the present invention seeks to provide a method of tracking an article using at least one tracking tag attached to an article in use, the method including, in a reader processing device of a tag reader: generating a broadcast message for transmission to a tag; and, receiving a tag message from the tag, the tag message being at least partially indicative of an identity of the tag and being used in determining a location of the article.

In one broad form an aspect of the present invention seeks to provide a method of tracking an article using an article tracking system including: a plurality of tracking tags, each tag being attached to an article in use; a number of tag readers; and, at least one processing system in communication with the number of readers, the method including: in the tag reader: communicating with tracking tags to determine an identity of each tag; and, generating location data at least partially indicative of a location of each tag; in the processing system: determining the location data; and, using the location data to track the location of articles.

It will be appreciated that the broad forms of the invention and their respective features can be used in conjunction, interchangeably and/or independently, and reference to separate broad forms is not intended to be limiting.

BRIEF DESCRIPTION OF THE DRAWINGS

An example of the present invention will now be described with reference to the accompanying drawings, in which:

FIGS. 11A to 11C are schematic diagrams of example graphical user interfaces;

DETAILED DESCRIPTION OF THE PREFERRED EMBODIMENTS

Figure 1:
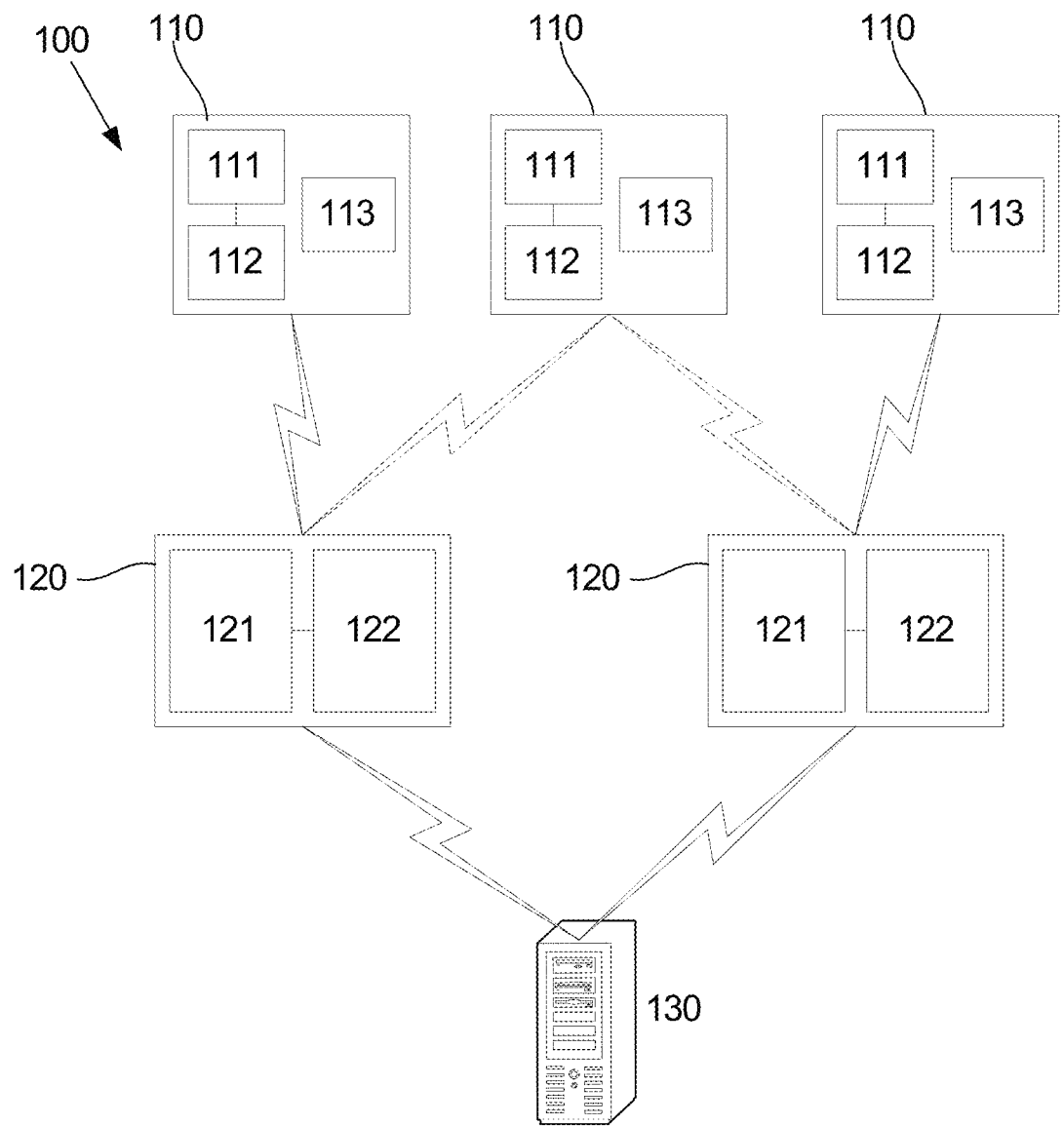
FIG. 1 is a schematic diagram of an example of an article tracking system.

An example of an article tracking system will now be described with reference to FIG. 1.

In this example, the article tracking system in 100 includes a number of tags 110 each of which is attached to an article in use. The nature of the article will vary depending on the preferred implementation. In one example, the system is used to track articles that are being transported, for example via a delivery network or the like. In this instance, the articles could be the items being transported themselves, such as packages, documents, luggage or the like, or alternatively could be a carrier, such as a container in which the items are placed or pallet on which items are stacked, often referred to as a Unit Load Device (ULD). It will be appreciated however that this is not intended to be limiting and the techniques could be applied to any article whose location needs to be monitored or otherwise tracked. Although three tags 110 are shown in this example, this is for the purpose of illustration only, and in practice a greater number of tags would typically be used in order to allow a corresponding number of articles to be tracked.

The system 100 further includes a number of tag readers 120, each of which is adapted to communicate with the tags 110, to thereby "read" the tags 110. Although two tag readers 120 are shown, in practice the article tracking system typically includes multiple tag readers, each of which is provided in a respective location, allowing the tags 110 to be read so as to determine the location of the article.

The system may also include a processing system 130, such as a computer system or server, in communication with the tag readers 120, allowing information regarding multiple tags in multiple locations to be consolidated. This in turn allows for the tracking of articles to be performed over multiple locations.

In one example, the tags 110 and tag readers 120 communicate by exchanging messages utilising a short range wireless communications protocol, such as Bluetooth Low Energy (BLE), or the like.

In order to achieve this, each tag 110 includes a tag transceiver 112 that transmits messages to or receives messages from the tag reader 120, a tag processing device 111 that interprets received messages and generates messages to be transmitted, and a tag power supply 113 that powers the tag processing device 111 and the tag transceiver 112.

The nature of the tag and in particular the physical form factor of the tag, as well as the components used, can vary depending on the preferred implementation. For example, when the tag 110 utilises a short range wireless communications protocol, such as BLE, the processing device 111 and transceiver 112 can be formed from a custom integrated circuit, such as a Bluetooth system on a chip (SOC), coupled to a suitable antenna and other optional components, such as additional memory, or the like.

The power supply 113 is typically adapted to provide power to the transceiver 112 and processing device 111 allowing the tag 110 to communicate with the tag reader 120. Whilst any appropriate power supply can be used, in one example the power supply is the form of "AA" battery having a minimal volume form factor, allowing the tag to be manufactured with small physical dimensions. This enables the tag 110 to be easily and unobtrusively attached to or provided in articles such as packages, documents, luggage or the like, without unduly impacting on the overall shape and weight of the article, whilst still providing significant battery life and avoiding issues arising from transportation of lithium-ion batteries. However, it will be appreciated that button shaped batteries and/or lithium ion batteries or similar, could be used.

Each tag reader 120 typically includes at least one reader transceiver 122, such as a Bluetooth module, that transmits messages to or receives messages from the tags 110 and a reader processing device 121 that operates to cause messages to be transmitted and interprets and actions received messages. The tag reader 120 may be statically positioned within a facility, and can be attached to a power supply such as a main electrical supply, or the like, although this is not essential and alternatively handheld or otherwise portable tag readers 120 could be used. The tag readers 120 also typically include an interface for wirelessly communicating with the processing system 130, depending on the preferred implementation.

Figure 2:
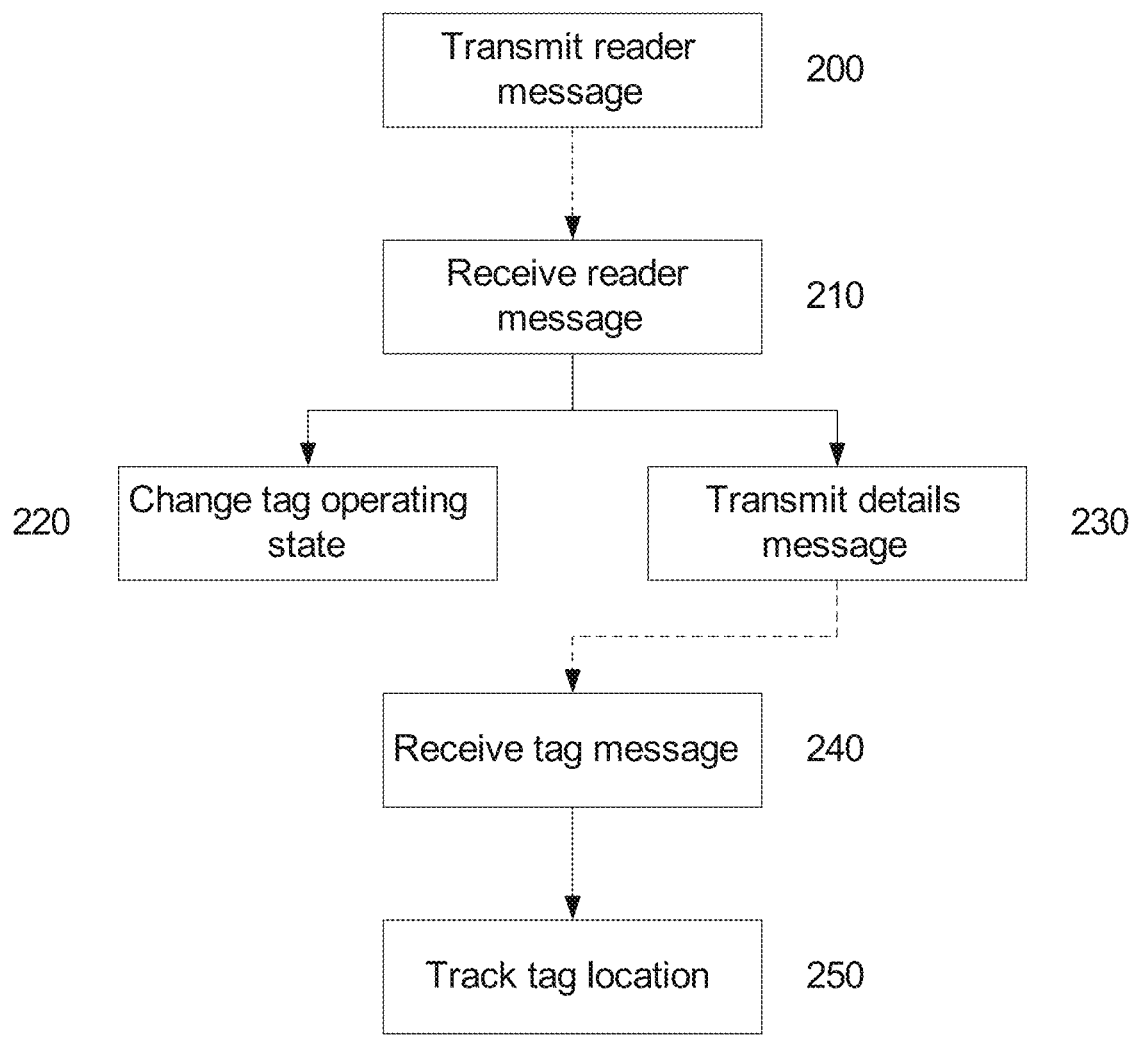
FIG. 2 is a flow chart of a method of tracking articles using the article tracking system of FIG. 1.

In use, the tags 110 and tag readers 120 are adapted to communicate in order to allow the tag readers 120 to determine an identity of the tag 110 and optionally to control an operating mode of the tag. An example of operation of the system 100 will now be described in more detail with reference to FIG. 2.

In this example, at step 200 the tag reader 120, and specifically the at least one reader transceiver 122 transmits a message. The message could be a broadcast message, which is adapted to be received and actioned by any tags 110 within range of the tag reader 120. In this regard, when using BLE, messages could be transmitted to tags more than 20 meters from the reader, and even up to 100 meters, depending upon the implementation and the environment, and so this could be received by tens or hundreds of tags. Alternatively messages could be specifically configured to be received and actioned by a particular tag 110, as will be described in more detail below.

The tags 110 initially operate in a passive mode in which the tag 110 is able to receive and interpret messages from the tag reader 120, but does not actively transmit messages. At step 210, tags 110 in the passive mode receive a message and use this to change the operating state of the tag 110 at step 220, and/or generate a tag message at step 230. In this regard, changing the operating mode of the tag 110 allows the operation of the tag to be controlled remotely by the tag reader 120. In particular, this allows tags 110 operate in a passive mode until instructions are received from a tag reader 120, at which point the tag 110 can enter a different operating mode, such as an active mode, sleep mode or power off mode.

In addition to, or instead of changing the operating state of the tag 110, in response to a broadcast message, the tag 110 can transmit a tag message to the tag reader 120 at step 230. In this regard, the tag message is at least partially indicative of an identity of the tag, for example by encoding a unique identifier associated with the tag. Knowledge of the identity of the tag can then be used in determining a location of the article. In particular, at step 240, the tag reader 120 receives tag messages from one or more of the tags 110 and uses the tag message to determine the tag identity. From this the article to which the tag is attached can be identified, with this information, together with knowledge of the location of the tag reader 120, allowing the location of the article to be tracked at step 250. In particular, this typically involves having the tag reader 120 generate location data, which for example is indicative of the tag identity and a location of the reader, with this being provided to the processing system 130 allowing the tag and hence article to be tracked.

The above described arrangement provides a number of benefits.

For example, tags 110 can be adapted to default to a passive operating mode in which the tag 110 does not actively transmit any messages. This is in contrast to traditional wireless communications processes that are active in the sense that messages are periodically transmitted to determine if there are any other compatible devices within range. Such active transmission has a number of negative effects and in particular can make the system unsuitable for use in certain radio sensitive environments, such as on aircraft. This can also utilise additional battery energy than would otherwise be the case for passive systems. Thus, utilisation of a passive operating mode can be an effective mechanism for increasing battery life, as well as allowing tags 110 to be utilised in a wide range of different environments.

A further benefit of the passive operating mode is that this reduces the number of messages that are transmitted to the tag readers 120. As tag readers 120 can be required to communicate with multiple different tags 110, reducing the number of messages that are received by the tag reader 120 makes additional bandwidth available, allowing a greater number of tags 110 to be successfully detected.

Nevertheless, the ability of the tag reader 120 to generate a message, which is then received by a tag 110 and utilised to alter the operating mode of the tag 110, allows communication in an active manner, allowing the tag reader 120 to effectively communicate with the tags 110 as required. For example, this allows the tag reader 120 to instruct the tag 110 to enter different operating modes, such as a sleep mode or power off mode, to further minimise power requirements and extraneous messages.

The above features therefore enable the tag to have a significantly extended power supply life, allowing a very limited power supply to last for three or five years in comparison to it lasting one or six weeks, which might otherwise be the case. This also allows the tags to be used in radio sensitive environments, whilst maximising the number of tags 110 that can be effectively tracked using a single tag reader 120.

A number of further features will now be described.

In one example, in the passive operating mode the tag processing device does not transmit messages. As previously indicated, this can reduce power consumption as well as allowing the tags to be used in transmission sensitive areas such as on aircraft. Nevertheless, this operating mode still allows messages from the tag readers 120 to be received, interpreted and actioned as required.

For example, in response to a broadcast message received from the tag reader 120, the tag processing device 111 can enter an active operating mode and then transmit the tag message including an indication of the identity of the tag. Whilst the tag processing device 111 typically changes the operating mode to allow a tag message to be transmitted, it will be appreciated that this may not be required depending on the preferred implementation. Transmission of the tag message, in turn allows the tag reader 120 to determine the identity of tags located in the vicinity of the tag reader 120, which can in turn be used for determining the location of articles. Specifically, in one example, the at least one reader transceiver 122 determines an identity of the tag from the tag message and provides a reader message to the tag reader processing device 121, the reader messages being indicative of the identity of the tag, allowing the reader processing device to determine the identity of the tag. This identity of the tag can then be used by the tag reader processing device 121 to generate the location data, which is provided to the processing system 130.

Additionally, this allows the tag reader processing device 121 to cause the at least one reader transceiver to generate at least one of a sleep message and a power message, in accordance with the identity of the tag, thereby allowing the tag to be instructed to enter a sleep or power off operating mode. The nature of these messages is not important, and particular reference to the terms "sleep" and "power off" is used in terms of the response of the tag to the message rather than necessarily the form of the message itself. Additionally, the term "power off" could refer to a deep sleep state and may not correspond to complete deactivation of power to the tag, and could correspond to a state in which minimal interaction can occur, optionally via a separate communications channel such as NFC (Near Field Communications), or the like.

Upon receipt of a sleep message from the tag reader 120, the tag processing device 111 enters a sleep operating mode for a defined time period, such as five seconds, ten seconds, sixty seconds, five minutes, or the like. The time period may be programmed into the tag 110, in which case the message could be a simple acknowledgement of receipt of the tag message from the tag 110, or could be embedded in the sleep message.

In the sleep operating mode, the tag processing device 111 is designed to not respond to messages from the tag reader, and in one particular example does not receive read messages, for example by deactivating the transceiver 112. It will be appreciated that the sleep operating mode allows the tag 110 to achieve further battery savings compared to the passive mode.

It will be appreciated that the tag 110 could enter a sleep mode automatically upon transmission of the tag message. However, this is typically not preferred as there is no mechanism for ensuring the tag message is received. Accordingly, in one example, once a tag reader 120 has received a tag message from the tag 110, the tag reader 120 generates and transmits a sleep message to that tag 110, causing the tag 110 to enter the sleep operating mode so that it does not respond to subsequent broadcast messages for the defined time period. As broadcast messages from the tag reader are not responded to, this reduces the number of tag messages generated, and in particular prevents tag messages being generated by tags 110 that have already been detected, for the predefined time period.

Similarly, the tag processing device 111 can be designed to respond to a power off message, in order to enter a power off operating mode in which the power supply 113 is deactivated. The power off mode can be used when a tag exits a tracking environment, such as a transport network, thereby reducing battery usage when the tag 110 is not in an environment in which the tag is being read. The ability to use software commands to power down the tag 110 enables the tag 110 to be switched off when the tag 110 is no longer needed, thereby further prolonging battery life of the tag, without requiring manual intervention.

Thus, the reader processing device 121 can be adapted to cause the tag transceiver 122 to transmit a broadcast message to cause the tags 110 to enter an active operating mode or at least generate a tag message, a sleep message to cause the tags 110 to enter a sleep operating mode and a power message to cause the tags 110 to enter a power off operating mode. Typically this is achieved by having the reader processing device generate commands to cause the at least one reader transceiver to generate messages. Similarly, for any response messages received from the tags, the reader transceiver typically generates reader messages, which are provided to the reader processing device, allowing this to take action as required.

In this regard, the reader can transmit the broadcast message to any tags within an operating range of the reader, with the tag processing device being responsive to the broadcast message to transmit the tag message in return. Upon receiving the tag message, the reader transceiver determines an identity of the tag from the tag message and then uses this to pass a reader message to the reader processing device, which in turn causes the reader transceiver to transmit one of a sleep message and a power message in accordance with the identity of the tag allowing the sleep or power message to be transmitted to the specific tag only. This ensures that tags are only put to sleep or powered off once these have been successfully detected by a reader.

In one example, the above controls are implemented in conjunction with a lack of any physical mechanism for deactivating the tag power supply 113, thereby ensuring that tags 110 cannot be physically turned off other than through the use of tag reader control. This prevents tags being deactivated by individuals, allowing them to move tags, and hence articles, without their location being tracked. The tag 110 could include a physical power supply switch to activate the power supply 113 and an optional power supply indicator, such as a low power LED or the like, to indicate once the power supply has been activated. In this manner, tags can be physically switched on but only switched off utilising software controls, preventing individuals moving articles without their location being tracked. However, alternatively the power on status of the tag could be controlled solely through remote interaction with the tags via messages from tag readers. In this instance, in a power off state, the tag could still use minimal power akin to a deep sleep state to allow the tag to be activated remotely as required. Additionally and/or alternatively the tag power supply could be activated via a different mechanism, such as using an NFC interaction between the tag and a device with an app installed on a client device, such as a phone. The NFC capability supports the client device being able to read the tag identifier without waking the tag, whilst also allowing the client device to be used to activate the power supply, to allow the BLE capabilities to be activated.

In order to prevent tags' power supplies failing, the tag message can include a tag identifier indicative of the identity of the tag, as well as a power supply indicator indicative of a power supply status, such as a battery charge level. In this manner, the current levels of charge remaining in a power supply battery can be monitored, so that alerts can be generated to ensure that power supplies are replaced prior to these failing.

The tag could also include a temperature sensor, with the tag message including a temperature indicator indicative of the maximum and minimum temperature to which the tag has been exposed between interactions with a reader. This can be useful in tracking tags, and in particular to ensure temperatures are as expected based on the journey the tag is undertaking. For example, if the tag is being transported by air, a low temperature corresponding to an aircraft hold temperature would be expected. This can also be used to identify potential exposure to extreme temperatures, which could in turn lead to damage to the tag.

The transceiver 112 is typically a Bluetooth transceiver and in one example, the tag is implemented utilising a Bluetooth system on a chip configuration as will be described in more detail below, although it will be appreciated that other suitable arrangements could be used, for example to utilise alternative communications protocols. The utilisation of Bluetooth however is particularly advantageous as this enables tags to communicate with readers over a significant greater range distance than using technologies such as RFID, minimising the number of readers that are required in order to read tags distributed over a similar physical area.

The tag 110 can also be labelled with information such as coded data indicative of the identity of the tag, and in particular machine readable coded data such as a barcode, QR code or the like, and/or visible markings or indicia indicative of an identity of the tag. This allows an identity of the tag to be determined using a scanning device, such as a barcode reader, or manually, for example from alphanumeric markings. This in turn enables the tag identifier to be determined without using a tag reader, which can assist with integrating operation of the tag into existing tracking systems. The tag may also further include a passive RFID tag allowing this to be tracked by existing RFID systems, for similar reasons. In one example, the passive RFID tag can include an NFC aerial that supports certain passive RFID frequencies, and can provide greater range than traditional RFID tag arrangements.

Typically the reader includes a plurality of reader transceivers that transmit or receive messages in parallel, thereby further increasing the number of tags that can be effectively communicated with utilising a single reader.

In one particular example, the reader processing device 121 communicates with the processing system 130 via a cellular communications network. This is particularly advantageous as it allows tag readers 120 to be installed in any location, without requiring particular communications infrastructure to be installed.

Once the tag reader 120 has determined the identity of tags in the vicinity of the tag reader 120, the reader processing device 121 can provide location data to a processing system 130, the location data being at least partially indicative of a location of the tag. In this regard, the location data can include a reader identifier indicative of an identity of the tag reader 120 and tag identifier indicative of an identity of the tag(s) 110. As each tag reader 120 is provided in a particular physical location, each tag reader identifier can be associated with a corresponding location, allowing the processing system 130 to determine an identity of the tag and its respective location. Thus, once the reader identifier and tag identifier have been determined, the processing system determines the reader location using the reader identifier.

In a similar manner, the tag is associated with an article, by having an article identifier indicative of an identity of the article associated with the tag identifier using association data. The association data can be created during an article registration process, during which an indication of the article identifier and the tag identifier is received from a client or scanning device, before being used to create the association data. For example, this can involve scanning a barcode or other similar coded data on the article, in conjunction with the scanning of a barcode or other coded data provided on the tag. This is used to create the association data, allowing the processing system 130 to subsequently determine the identity of the article based on the tag identifier received from the tag reader 120. It will be appreciated that associating each tag with a respective article allows article level tracking throughout the entire transport process.

Having determined the location and identity of an article, the processing system 130 can generate a representation, including an indication of the location of the article. The representation can include a map showing the location of the article and one more visual indicia selected at least partially in accordance with the location. Accordingly, it will be appreciated that the above described arrangement allows a large number of tagged articles to be tracked throughout a supply chain.

A further example system will now be described in more detail with reference to FIGS. 3 to 7.

In this example, the tracking system includes a plurality of tags 310, a number of readers 320 provided at respective physical locations, a processing system 330, such as one or more servers, in communication with one or more client devices 350, via one or more communications networks 340. In this example, the tag readers 320 are adapted to communicate wirelessly with the processing system 330, which is in turn in communication with the one or more client devices 350 via the communications networks 340, such as the Internet, and/or a number of local area networks (LANs).

It will be appreciated that the configuration of the networks 340 are for the purpose of example only, and in practice the processing system 330 and client devices 350 can communicate via any appropriate mechanism, such as via wired or wireless connections, including, but not limited to mobile networks, private networks, such as an 802.11 networks, the Internet, LANs, WANs, or the like, as well as via direct or point-to-point connections, such as Bluetooth, or the like. Whilst communication between the tag readers 320 and processing systems 330 will also occur via communications networks, this is represented separately to highlight that this communication occurs via a specific form of network, namely the cellular communications network, as will be described in more detail below. Additionally, client devices 350 such as mobile phones, can be configured to communicate with tags 310 directly via wireless connections, such as Bluetooth, NFC or the like.

Furthermore, in one example, multiple tag readers at a site could communicate to establish a mesh network, either by Bluetooth or WIFI communication between the readers in a dedicated local network, allowing these to coordinate communication with the processing system 330, for example by electing one of the tag readers 320 to act as a master reader which can determine the precise location of a tag based on the input of all other local readers, with all communications with the processing system 330 being via the master reader.

In one example, each tag reader 320 is adapted to read one or more tags and provide location data to the processing system 330 for analysis. This allows the processing system 330 to consolidate location data from multiple tag readers 320, using this to identify the location of articles, and then make this information available to users via the client devices 350.

Whilst the processing system 330 is shown as a single entity, it will be appreciated that in practice the processing system 330 can be distributed over a number of geographically separate locations, for example as part of a cloud based environment. However, the above described arrangement is not essential and other suitable configurations could be used.

Figure 4:
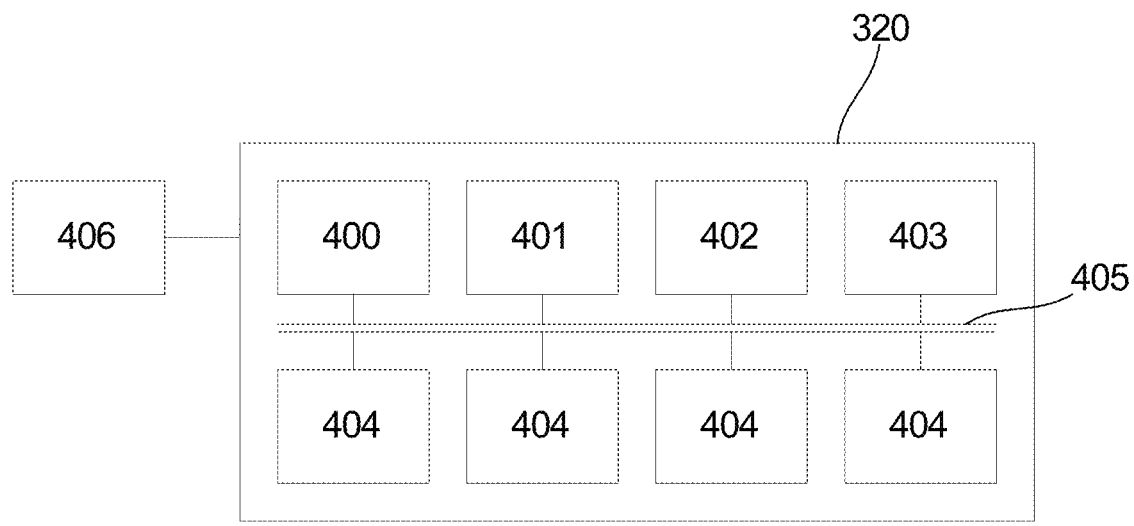
FIG. 4 is a schematic diagram of an example of the tag reader of FIG. 3.

An example of a tag reader 320 will now be described in further detail with reference to FIG. 4.

In this example, the tag reader 320 typically includes a microprocessor 400, a memory 401, an optional input/output (I/O) device 402, an external interface 403 and a number of transceivers 404, interconnected via a bus 405.

In one example, the tag reader 320 is provided in a housing made of plastic, or another suitable material, with components mounted internally on a suitable board, such as a motherboard, which in one example, includes an multi-core processor 400 running a suitable operating system, together with associated memory 401, such as RAM and storage.

In use, the microprocessor 400 executes instructions in the form of applications software stored in the memory 401 to allow the required processes to be performed. In one example, the microprocessor 400 can execute two applications including an application to manage communication with the tags 310, including collecting the BLE data and transmitting "first seen" and "last seen" information about tags 310 to the processing system 330, and a second application to allow remote management via a central management web console, managed via an encrypted connection.

Whilst the microprocessor 400 can be a standard microprocessor, such as an Intel Architecture based microprocessor, this is not essential and any suitable arrangement, such as microchip processor, logic gate configuration, firmware optionally associated with implementing logic such as an FPGA (Field Programmable Gate Array), or any other electronic device, system or arrangement, could be used.

The external interface 403 can be utilised for connecting the tag reader 320 to the processing system 330, and in one example includes a cellular communications interface, such as an integrated cellular dongle with an installed SIM card. Additionally and/or alternatively this could be used to allow the tag reader 320 to communicate with other tag readers 320 in a facility, allowing the tag readers 320 to establish a mesh network, using known techniques. In this instance, the tag reader microprocessor 400 will typically operate a control algorithm that establishes master/slave relationships between the tag readers 320, with communications being routed via the master tag reader 320, so that only the master tag reader 320 need to communicate with the processing system 330.

Multiple, and in one example, eight BLE modules 404 are also provided, to allow parallel communication with multiple tags 310. In this regard, it will be appreciated that whilst each transceiver can typically handle communication with a number of tags 310 substantially simultaneously, in accordance with standard BLE protocols, using multiple transceivers further increases the ability to communicate with multiple tags 310. Furthermore, the BLE modules 404 could be physically spaced and/or orientated in a particular manner to optimise the coverage provided by the tag reader 320. In general, the processor 400 is adapted to generate commands to instruct the BLE modules to perform certain actions. For example, the processor 400 can send UART (Universal asynchronous receiver/transmitter) commands via a dedicated UART bus, causing the BLE modules 400 to perform actions, including but not limited to changing a BLE module setting, causing the BLE module to transmit a broadcast message, a sleep message or a power off message.

Typically communication steps between the processor 400, the BLE modules 404 and tags 310 are as follows:

The tag processor 400 sends UART Command (Reader Setting) to the BLE module 404 causing the BLE module 404 to change its setting. This can be performed at any stage in the process. In the event that an advertisement command is provided, this causes the BLE module 404 to transmit broadcast messages.

Upon connection the tag 310 will return a tag message including a tag identifier as a payload. The BLE module 404 will add an RSSI value and the BLE module ID and forward this to the tag processor 400 as a reader message.

The processor 400 will send a UART Command (Tag Setting) payload which will be forwarded to the tag as a reader command payload All UART commands will result in a response being sent back which echoes the original command. The reader message for UART Command (Tag Setting) payloads will only be sent when it confirms the tag has received the payload.

Long Sleep or Power Off commands will be the last reader command payload sent. After it is sent the BLE module 404 will disconnect. A disconnect log message will be sent to processor 400 as a reader response payload.

Whilst the tag reader 320 may include an I/O device 402, typically each reader is provided in a respective physical box that does not include any physical external interfaces or user interface. In this regard, the tag reader 320 is adapted to communicate with the tags via BLE and transmit tag data to a central server via cellular communications, meaning all interaction with the reader is via wireless interfaces. Accordingly, when deployed the only external connection is for an external power supply. In addition to being powered by an external power supply, each reader would also typically incorporate a backup battery that allows the reader to detect loss of mains power (intentional or otherwise) and execute a shut down routine, including informing nearby readers and/or the processing system that it is shutting down.

Obviating the need for a physical interface has a number of benefits. Firstly, this reduces the cost of manufacture by removing the need for external physical ports in the housing, thereby simplifying the housing configuration. Secondly, removal of ports reduces the ability of the third parties to fraudulently access the reader, for example by remotely accessing the reader via an Ethernet or other similar interface. Thirdly, this reduces the chance of damage to equipment, for example through ingress of liquids or other physical contaminants.

Additionally, from a security perspective there are no inputs, such as microphones or cameras, so sound or images can't be captured and transmitted. There is no wireless connection, other than the BLE and cellular connections, so even a remote management user would not be able to see an SSID (Service Set Identifier) of a local wireless network. Any internal communications ports, such as USB, Ethernet or HDMI ports will be disabled at the operating system level when deployed, and SIM cards are M2M (machine to machine) and can't be used for voice even if inserted in a different device or phone.

This makes it difficult for third parties to access the functionality of the tag reader 320, and hence subvert or otherwise effect the operation of the tag reader 320, thereby ensuring reliable operation of the tag reader 320, and successful tracking of tags 310 and hence articles.

The tag readers 320 are also able to communicate with the processing system 330 to provide a range of additional functionality, including but not limited to:

viewing a tag reader status remotely;
pushing software updates to the reader processor, including updates for the Bluetooth modules and the tags;
receiving or retrieving log files; and,
rebooting remotely.

Specifically, the tag readers 320 in a mesh network are typically configured to:

elect a master tag reader 320 to perform all communication within the processing system 330;
elect a secondary tag reader 320 to provide failover should the master tag reader 320 fail;
communicate to exchange details of detected tags so that each tag reader maintain a common record the local tags thereby increasing resilience of the detection system and preventing loss of data in a failure scenario;
communicate to exchange RSSI (Received Signal Strength Indication) values for each detected tag allowing a tag reader 320, such as the master tag reader 320 to calculate a more accurate position of all tags, typically to within 1-2 meters;
reduce communications with the processing system 330 by only transmitting when a tag has changed state, for example, when the tag has moved in or out of an area, switched off, entered sleep mode, or the like;
create virtual areas (geo-fences) that are a subset of the total range of the local network to improve tracking.

This arrangement allows the tag readers to reduce the amount of communications required with the processing system 330, thereby reducing communication bandwidth requirements and costs. In particular, this is achieved by maintaining redundant records of tag detection events on each tag reader, so that this can be recovered in the event of failure of individual tag readers. This also allows the tag readers to coordinate to track changes in tag status between multiple readers, so that only changes are notified to the processing system 330. For example, in the event that different tag readers 320 detect the tag, only a single tag detection would be notified.

This further allows for an improved resolution of tracking, allowing RSSI signals to be used to detect a tag location with a greater resolution that would be the case if coordination were not used. This in turn allows virtual areas to be defined within a facility, with entry and exit from the areas being detected. For example, an area could be defined as "import" and be constrained to 10 square meters of the door for inbound ULDs, such as pallets or the like, with a far end being defined as "export" and the tags being tracked between these virtual areas.

Figure 5:
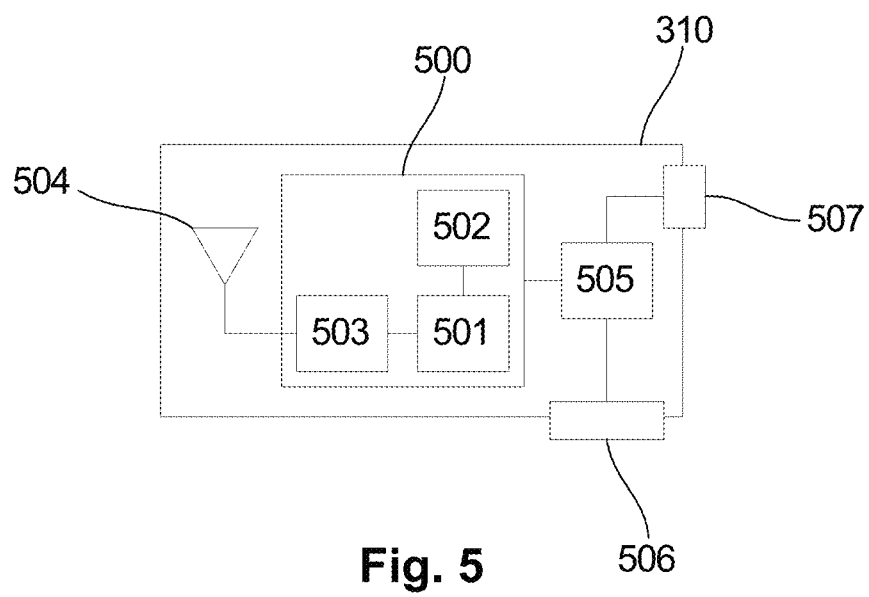
FIG. 5 is a schematic diagram of an example of the internal components of the tag of FIG. 3.

An example of a tag is shown in more detail in FIG. 5.

In this example, the tag 310 includes a BLE system on a chip (SoC) 500, including an integrated processor 501, memory 502 and transceiver 503, which is in turn connected to an antenna 504, which in one example is a miniature chip antenna, or the like. The SoC 500 is powered by a power supply 505, such as a battery. In a particular preferred example, to minimise the tag form factor, whilst providing long battery life and avoiding issues associated with transportation of hazardous batteries, the battery is a AA battery.

Tags typically transmit using BLE (Bluetooth Low Energy) Specifications in the 2.4 GHz~2.48 GHz unlicensed ISM Band, and have a transmission distance of >20 m line of sight.

The tag processor 501 executes instructions stored in the tag memory 502 to allow the required processes to be performed, including interpreting and actioning messages received from the tag reader, as will be described in more detail below. It will also be appreciated that whilst reference is made to a BLE SoC, it will be appreciated that other arrangements could be used, and this is not intended to be limiting.

The tag 310 is associated with a unique tag identifier, which is stored in the memory 502. The identifier can be of any appropriate form and in one example is a unique value, such as a binary or hexadecimal code. The tag can also include additional onboard memory that can be written to with a new command and read by the tag reader 320. This could be a limit of a few characters, such as 32 or 12 characters depending on chip capabilities and power usage, and can be used to append additional information, such as an article identifier, which can then be provided as part of a tag message.

The tag further includes an indicator, such as an LED 507, which can be adapted to indicate that the power supply has been activated, as well as a temperature sensor allowing a temperature to which the tag is exposed to be determined.

The batteries, board, antenna button and LED are contained in a sealed housing, formed from a thin plastic or other similar material. This ensures the housing has a minimal volume, not much larger than the battery itself, allowing the tags 310 be easily placed in plastic envelopes on oversized packages, or the like. This also allows the packages to be weather proof and highly durable, allowing them to withstand forces, such as impacts and stacking of articles. The housing can also have a hole in one corner for a cable tie so it can be attached to articles using the tie.

The tags are typically capable of operating in both activate and passive modes. In this regard, active BLE devices are approved for use on aircraft, whilst passive BLE devices do not need approval as they only transmit in the presence of a reader, accordingly, this allows the tags to be used in typical transport scenarios.

From a security point of view the tags 310 can only transmit limited data to a reader and vice versa. They can only transmit via the BLE protocol and cannot connect to wireless networks. This limits the ability for third parties to access the information stored in the tags, or otherwise control the tags, which would require specific knowledge of the protocols used by the tags 310 and tag readers 320. This prevents individuals spoofing or otherwise interfering tags so as to move articles without these being tracked.

The physical tags 310 can be labelled with information, including a machine readable code, such as a barcode, QR code, or the like, as well as information including a logo or other company identifier, a serial number, the tag identifier, legal information, FCC compliance, customs requirements, or the like. In one example, the labelling can include a Code 128 barcode in the format #00000xxxxx (where the tag ID is xxxxx) and printed (text) ID beneath the barcode.

As previously mentioned, in one example, the tags are adapted to be used with ULDs, allowing the ULDs to be tracked.

In the case of ULDs in the form of pallets, the pallet typically includes an aluminum base, onto which freight is stacked, with the freight being retained in position using netting or the like. The netting is retained by bolts that fit into a seat track rail extending around a perimeter edge of the pallet. The rail includes spaced holes into which the bolts are inserted, with intervening channels holding the bolts in position, so that the bolts can be attached in different locations depending on requirements.

An example of a tag suitable for use in such an arrangement is shown in FIGS. 13A to 13F.

In this example, the tags 1300 are configured to physically attach to the rail using mounting bolts 1303 at opposing ends of a metal plate 1301, to which is attached a cover 1302. The cover 1302 is ruggedized and shaped such that a direct impact by a fork lift during handling of the ULD is deflected, thereby preventing damage to the tag.

The bolts 1303 align with holes 1311 in the channel 1312 of the rail 1310, so that they can be inserted into the channel 1312 and interface with the narrowed section of the channel to hold the tag in position. Additionally, a second mounting element, in the form of a plate can be attached, which engages the holes, and thereby holds the bolts in channels between the holes to prevent the tag disengaging from the channel. The tag is sized in accordance with airline regulations so that no more than four holes in the seat track rail are covered.

A further specific example of a tag is shown in FIGS. 14A to 14J.

In this example, the tag 1400 is formed from a base 1401, including a flat laminar metal plate 1401.1 bent to form a lip 1401.2 extending at least part way around a perimeter of the base 1401. Apertures 1401.3 extend perpendicularly through the lip 1401.2 at opposing ends of the plate to define bolt openings 1403.

The tag 1400 includes a cover 1402, having a cover body 1402.1 that when coupled to the base 1401 defines a cavity 1402.4 that contains tag components. The cover 1402.1 includes a tongue 1402.2 extending laterally around at least part of a perimeter of the cover body 1402.1, which engage with the lip 1401.2 to secure the cover 1402 to the base 1401. The metal lip 1401.2 also acts to provide extra protection to edges of the tag, preventing damage to the tag in use. The cover 1402 is typically formed from a plastic, and typically a PC/PBT (Polycarbonate/Polybutyleneterephthalate) mix, which provides for good impact resistance and weathering properties, whilst allowing penetration of radio signals into the tag components.

Portions of the tongue 1402.2 at either end of the cover 1402 include apertures 1402.3 that align with apertures 1401.3 in the lip 1401.2 to define the bolt holes 1403, so that when bolts are inserted into the bolt holes 1403, the cover 1402 and base 1401 are secured together.

In use, the cavity 1402.4 contains electronics 1404 and a battery housing 1405. Specifically, the electronics 1404 are components 1404.3 mounted on a printed circuit board (PCB) 1404.1. Spacers 1404.3 are provided to seat the PCB 1404.1 relative to the cover 1402. The battery housing includes a battery housing body 1405.1 including recesses 1405.2 for receiving batteries 1406.

The battery housing also includes a ridged lip 1405.3 extending laterally outwardly from a lower edge of the battery housing body 1405.1, which sits in a recess in an underside face of the cover 1402, to thereby provide sealing engagement and prevent ingress of water and other contaminants. Further sealing can be effected by a sealant, such as a rubberised glue, extending between the battery housing and cover to ensure the tag is sealed against water and pressure changes.

Figure 6:
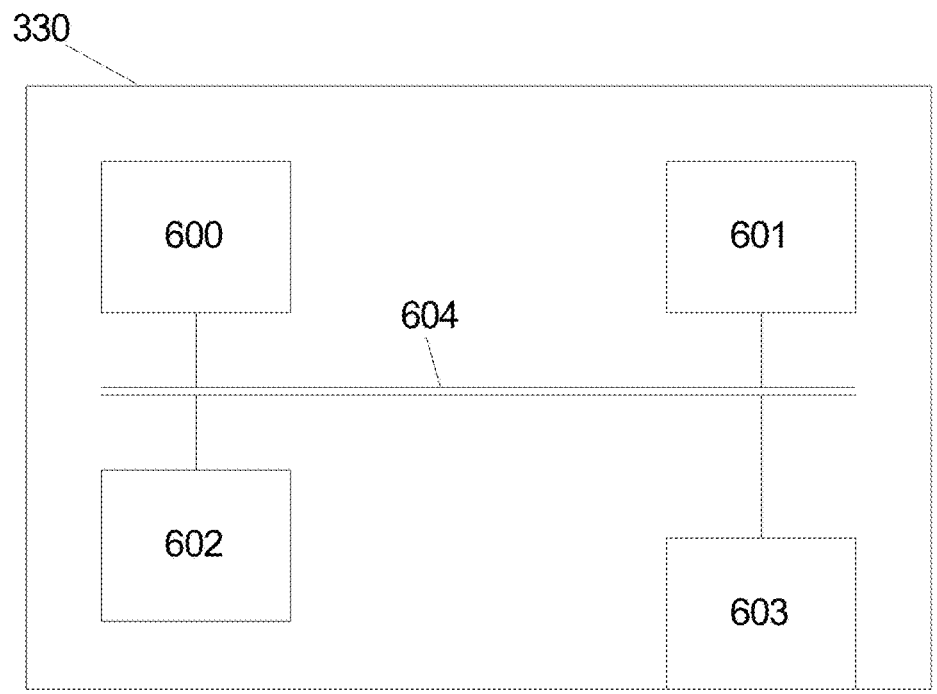
FIG. 6 is a schematic diagram of an example of the processing system of FIG. 3.

An example of a suitable processing system 330 is shown in FIG. 6.

In this example, the processing system 330 includes at least one microprocessor 600, a memory 601, an optional input/output device 602, such as a keyboard and/or display, and an external interface 603, interconnected via a bus 604 as shown. In this example the external interface 603 can be utilised for connecting the processing system 330 to peripheral devices, such as the communications networks 340, databases, other storage devices, or the like. Although a single external interface 340 is shown, this is for the purpose of example only, and in practice multiple interfaces using various methods (eg. Ethernet, serial, USB, wireless or the like) may be provided.

In use, the microprocessor 600 executes instructions in the form of applications software stored in the memory 601 to allow the required processes to be performed. The applications software may include one or more software modules, and may be executed in a suitable execution environment, such as an operating system environment, or the like.

Accordingly, it will be appreciated that the processing system 330 may be formed from any suitable processing system, such as a suitably programmed client device, PC, web server, network server, or the like. In one particular example, the processing system 330 is a standard processing system such as an Intel Architecture based processing system, which executes software applications stored on non-volatile (e.g., hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), or any other electronic device, system or arrangement.

Figure 7:
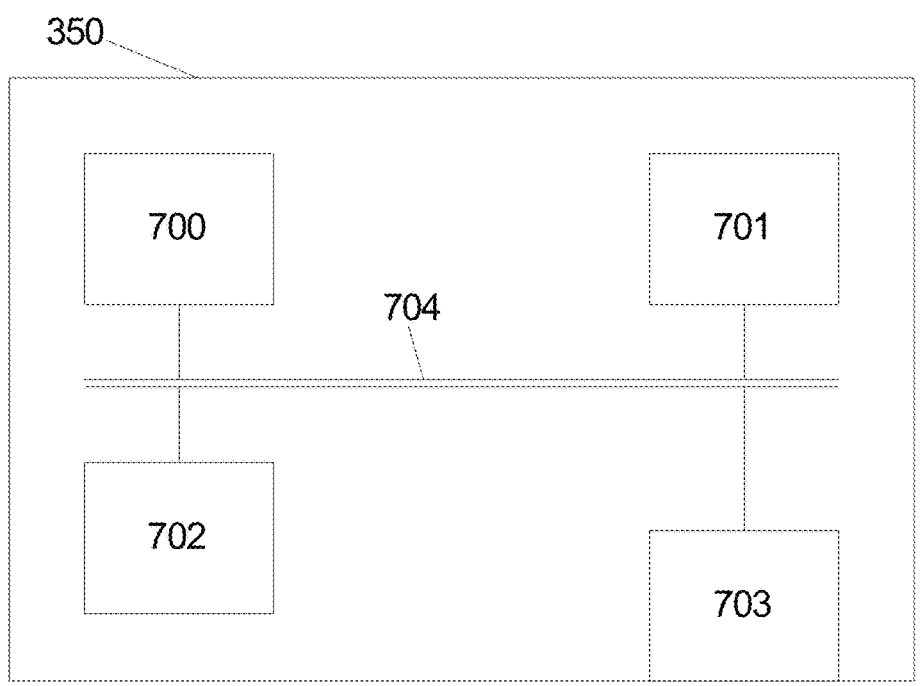
FIG. 7 is a schematic diagram of an example of the client device of FIG. 3.

As shown in FIG. 7, in one example, the client device 350 includes at least one microprocessor 700, a memory 701, an input/output device 702, such as a keyboard and/or display, and an external interface 703, interconnected via a bus 704 as shown. In this example the external interface 703 can be utilised for connecting the client device 350 to peripheral devices, such as the communications networks 340, databases, other storage devices, or the like. Although a single external interface 703 is shown, this is for the purpose of example only, and in practice multiple interfaces using various methods (eg. Ethernet, serial, USB, wireless or the like) may be provided.

In use, the microprocessor 700 executes instructions in the form of applications software stored in the memory 701 to allow communication with the processing system 330.

Accordingly, it will be appreciated that the client devices 350 may be formed from any suitable processing system, such as a suitably programmed PC, Internet terminal, laptop, or hand-held PC, and in one preferred example is either a tablet, or smart phone, or the like. Thus, in one example, the client device 350 includes a standard processing system such as an Intel Architecture based processing system, which executes software applications stored on non-volatile (e.g., hard disk) storage, although this is not essential. However, it will also be understood that the client devices 350 can be any electronic processing device such as a microprocessor, microchip processor, logic gate configuration, firmware optionally associated with implementing logic such as an FPGA (Field Programmable Gate Array), or any other electronic device, system or arrangement.

Examples of the processes for tracking articles will now be described in further detail. For the purpose of these examples it is assumed that interaction between the processing system 330 and client devices 350 are via hosted webpages or an App residing on the client device 350. The processing system 330 is therefore typically a server that communicates with the client device 350 via a communications network, or the like, depending on the particular network infrastructure available, and further communicate with the tag readers 320 via a cellular communications network.

To achieve this the processing system 330 executes applications software for communicating with the tag readers 320, as well as communicating with the client devices 350, with actions performed by the processing system 330 being performed by the processor 600 in accordance with instructions stored as applications software in the memory 601 and/or input commands received from a user via the I/O device 602, or commands received from the client device 350.

It will also be assumed that the user interacts with the processing system 330 via a GUI (Graphical User Interface), or the like presented on the client device 350, and in one particular example via a browser application that displays webpages hosted by the processing system 330, or an App that displays data supplied by the processing system 330. Actions performed by the client device 350 are performed by the processor 700 in accordance with instructions stored as applications software in the memory 701 and/or input commands received from a user via the I/O device 702.

However, it will be appreciated that the above described configuration assumed for the purpose of the following examples is not essential, and numerous other configurations may be used. It will also be appreciated that the partitioning of functionality between the client devices 350, the processing system 330 and tag readers 320 may vary, depending on the particular implementation.

Figure 8:
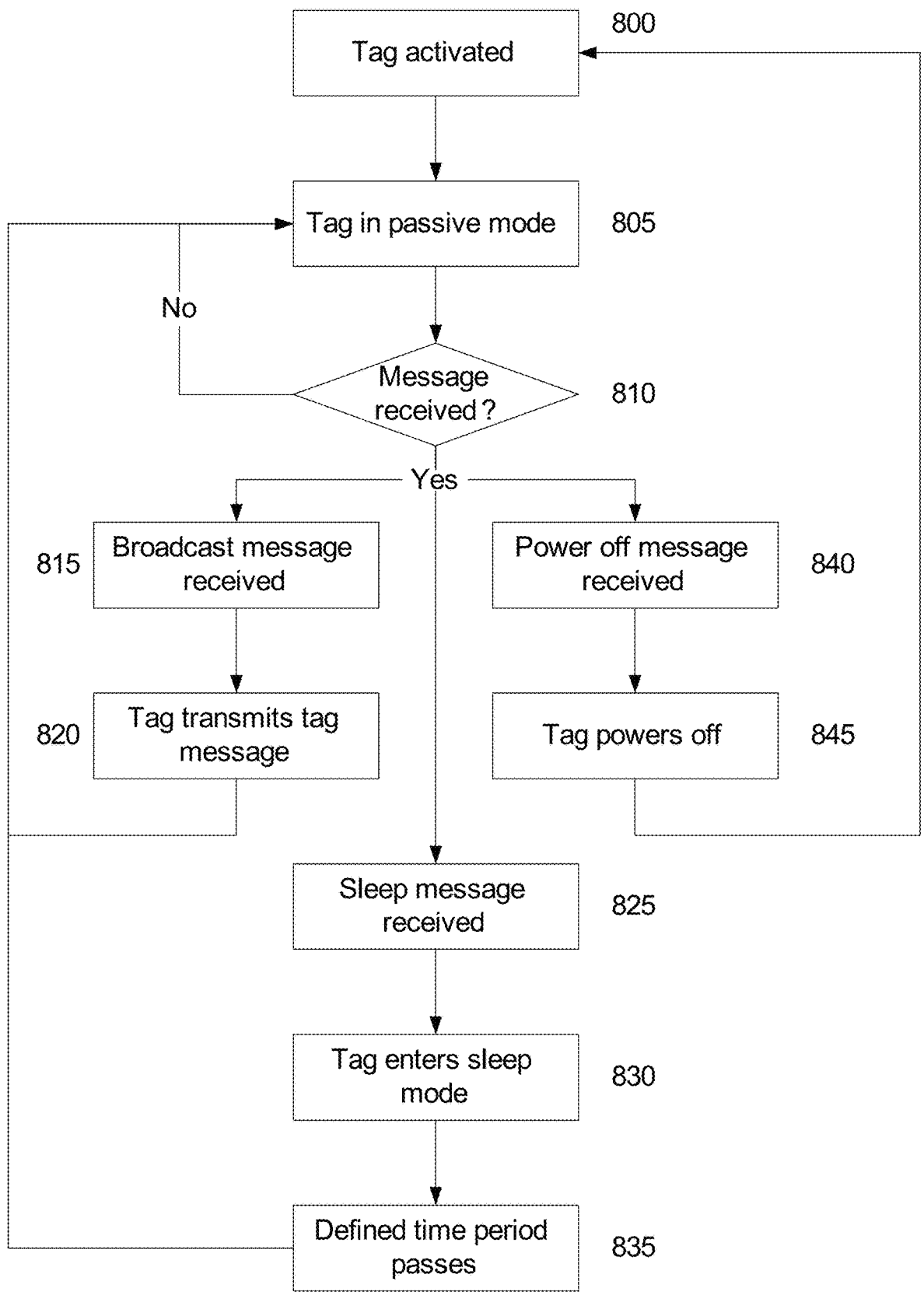
FIG. 8 is a flow chart of an example of the operation of a tag.

An example of operation of the tag 310 will now be described in more detail with reference to FIG. 8.

Initially, at step 800 the tag 310 is turned on by pressing the physical power supply button 506, causing the tag processor 501 to be activated. Once activated, the tag processor 501 immediately enters a passive operating mode at step 805. Once in the passive operating mode, the tag processor 501 will determine if a message has been received at step 810, and if not remains in the passive state.

When a message is received, the tag processor 501 will determine the nature of the message and in particular whether this is a general broadcast message, a sleep message or a power off message. In this regard, the broadcast message will be transmitted from a tag reader 320 to all tags within a communicating range, whilst the sleep and power off messages will be transmitted to specific tags through appropriate configuration of the message, such as inclusion of a tag identifier in a message header.

If a broadcast message has been received, at step 815 the tag processor 501 operates to generate a tag message, including the tag identifier retrieved from the memory 502, which is then transmitted to the tag reader 320 at step 820, before the tag processor 501 returns to the passive mode at step 805.

If the message received is a sleep message at step 825, then the tag processor 501 enters a sleep mode for a predefined time period at step 830. The time period could be specified in memory 502 of the tag, or could be defined in the sleep message received from the tag reader 520, depending on the preferred implementation of the system. Once the tag processor 501 determines the defined time period has passed at step 835, the tag processor 501 returns to the passive mode at step 805.

Alternatively, if the tag processor 501 receives a power off message at step 840, then the tag processor 501 deactivates the power supply 505, only returning to a power on state if tag is activated again using the physical power on button 506.

Figure 3:
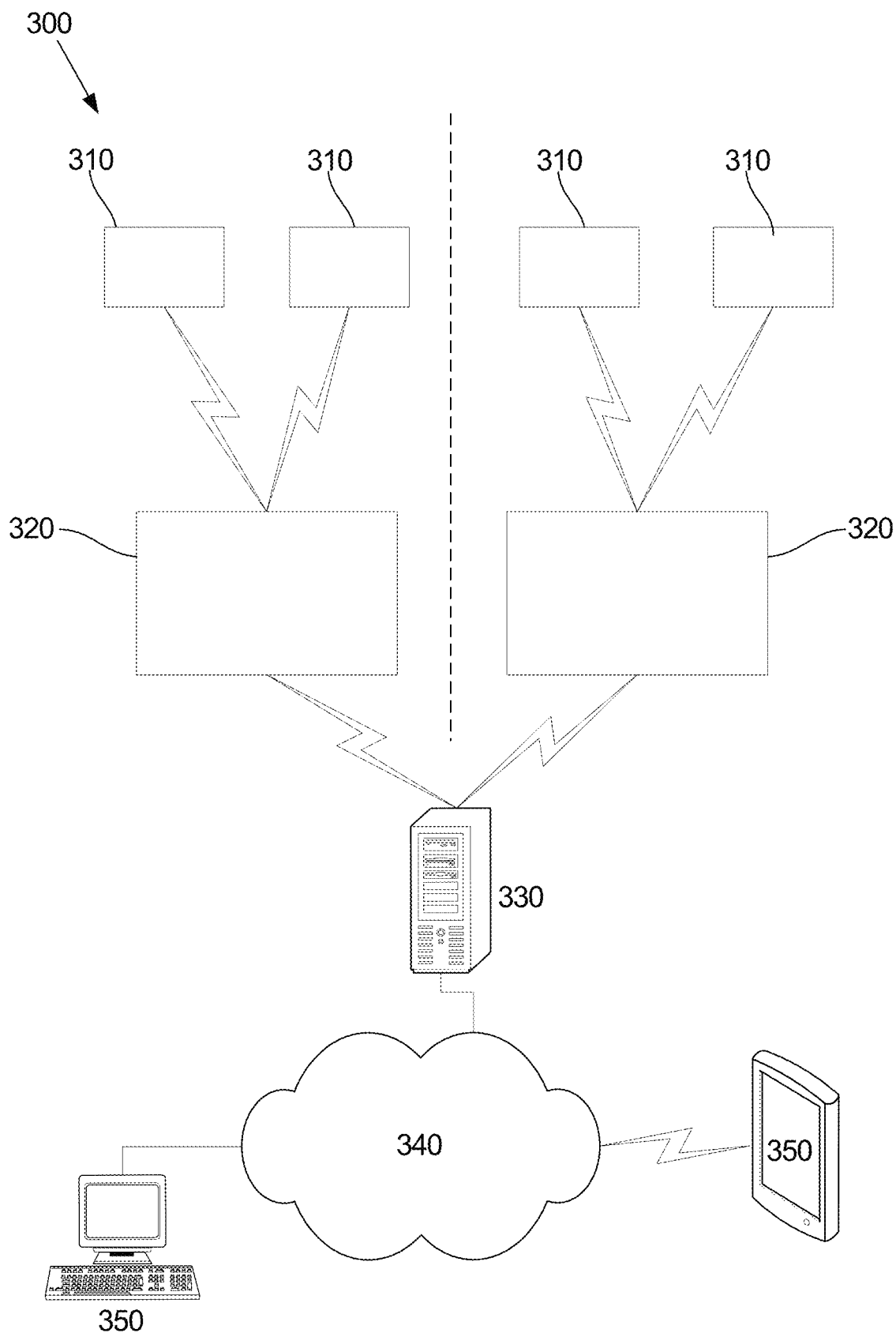
FIG. 3 is a schematic diagram of a further example of an article tracking system.
Figure 9:
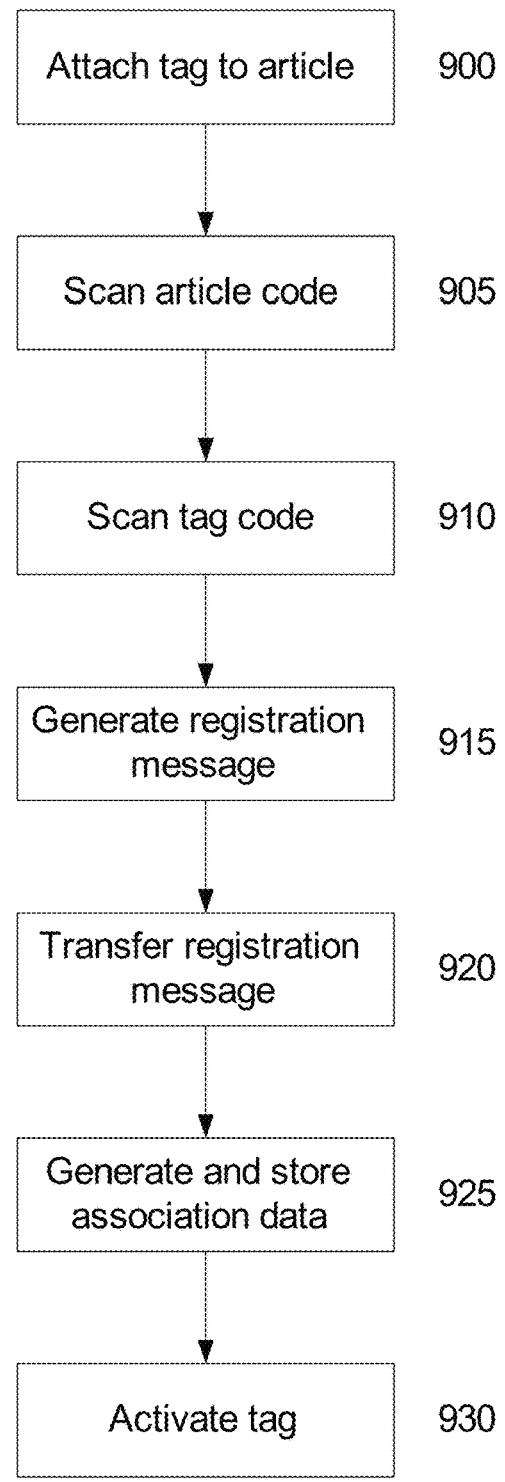
FIG. 9 is a flow chart of an example of an article registration process.

In use, the system of FIG. 3 allows tags 310 to be tracked by positioning the tag readers at particular locations, and then detecting the presence of the tags 310 in the vicinity of the respective tag readers 320 to thereby ascertain the tag location. However in order to allow articles themselves to be tracked, the tags 310 must be associated with the articles to which they are attached. This is typically performed during an article registration process, and an example of this will now be described with reference to FIG. 9.

In particular, in this example, the article registration process is performed in order to uniquely associate an article with a respective tag, based on the tag identifier, which is in turn uniquely indicative of an identity of the tag. This process typically occurs when the article is to enter a transport network, such as when a parcel is received at a post office or delivery centre, or when luggage is provided to the airline at an airport.

In this example, at step 900 a tag is attached to an article. This may be achieved in any suitable manner, such as attaching the tag as part of or using an adhesive label, attaching the tag to the article using a string, ribbon or cable tie, placing the article in an envelope or pouch attached to the article, or enclosing the tag within the article, such as providing this within article packaging.

Following, or as this is performed, at step 905, an article identifier associated with the article is determined. The article identifier could be of any suitable form and may be associated with the article, for example as part of shipping documents, or the like, in accordance with standard article handling protocols. The identifier could be determined by scanning coded data, such as a barcode provided on the article using dedicated hardware, such as a barcode scanner, or using a suitably equipped client device 350, such as a mobile phone. Alternatively, this could be performed manually by having a user enter the article identifier via a suitable user interface presented on the client device 350.

At step 910, a tag identifier associated with the tag 310 is determined. Again this could be performed by scanning or reading a coded tag identifier displayed on the tag, or manually via an interface presented on the client device 350.

Whilst this could be achieved by interrogating the tag 310 using a tag reader 320, such operation could be difficult if many tags are present. Additionally, it is preferred if the registration process can be performed using existing hardware, such as a client device 350, thereby avoiding the need for a dedicated tag reader 320 at this stage of the process.

At step 920, either the scanning device or the client device 350 generates a registration message including the article and tag identifiers, with this being transferred to the processing system 330, allowing the processing system 330 to generate and store association data at step 925. In this regard, the association data records an association between the tag identifier and the article identifier, so that the identity of the article can be determined from the tag identifier in subsequent steps of the article tracking process.

Finally, at step 930 the tag is activated by pressing the power button 506, causing the tag 310 to enter the passive operating mode and await subsequent commands from a tag reader 320. Whilst shown as the final step in the process, it will be appreciated that activation of the tag 310 could be performed at any appropriate stage, such as when scanning or attaching the tag 310 to the article and this is not intended to be limiting.

Figure 10A:
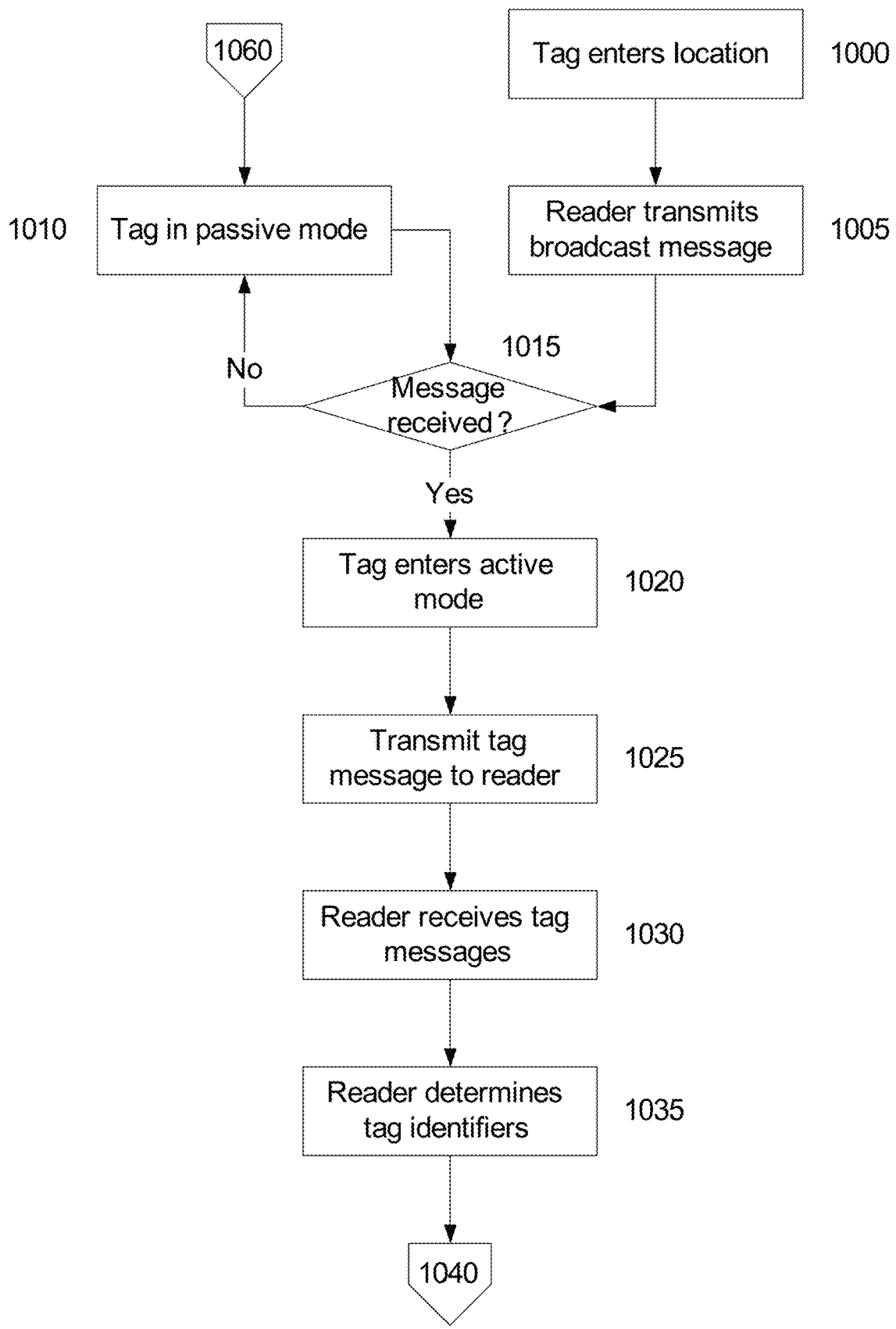
FIGS. 10A and 10B are a flow chart of a specific example of a method of using an article tracking system.
Figure 10B:
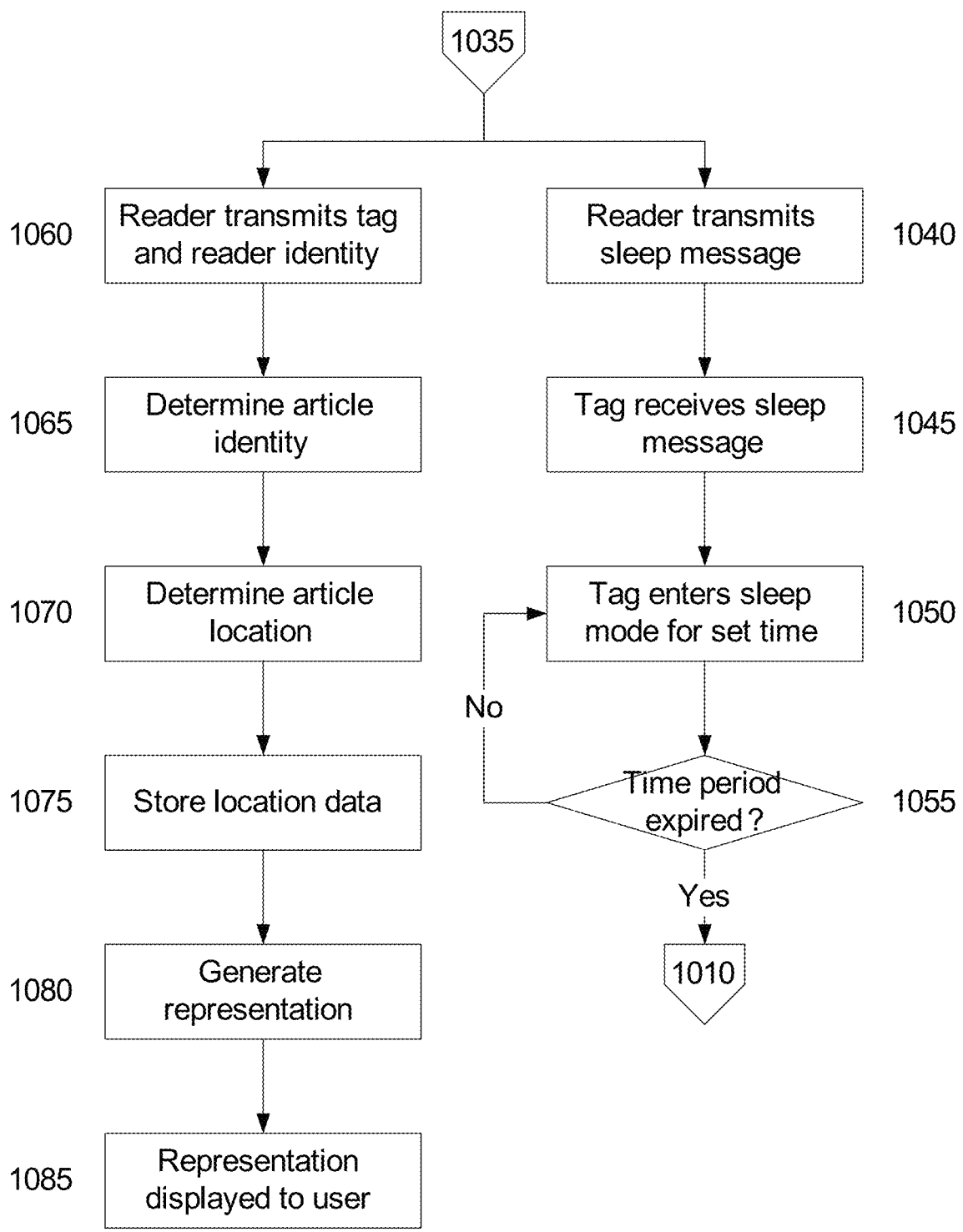

Once the tag has been associated with an article and activated, this can now be used when tracking articles. An example of this will now be described with reference to FIGS. 10A and 10B, which describe utilisation of the tag as part of a package tracking process in a transport network.

In this example, tag readers 320 are provided within facilities within the transport network, with the facilities being buildings or locations where the articles are handled, such as sorting depots, loading or unloading depots, routing facilities or the like. However, it will be appreciated that this for the purpose of illustration and in practice the tag readers could be located at any suitable location within the network. Furthermore, as tag readers 320 can communicate via a wireless cellular network, they are not limited to being provided at static location and could be provided in vehicles, such as trucks, trains and ships, providing this would not interfere with operation of the vehicle. Hence reference to facilities is not intended to be necessarily limited to static situations.

When the tag readers are installed, an indication of a tag reader identifier is typically stored by the processing system 330, for example, by having a client device 350 provide an indication of the reader identifier and an installed location. This can be performed in a registration process similar to that used above with respect to articles, substituting an indication of the location for the article identifier, and this will not therefore be described in any detail.

At step 1000, an article having an attached tag enters a location such as a facility, with one or more tag readers 320 within the facility transmitting a broadcast message at step 1005. It will be appreciated that the broadcast message is transmitted repeatedly, and hence this will typically be detected a short time after to the tag 310 enters the facility. In this regard, the tag 310 is initially in a passive mode at step 1010, with the tag detecting whether a message is received at step 1015. This will be repeated until the broadcast message is received, at which point the tag processor 501 enters the active operating mode at step 1020.

Once in the active mode, the tag processor 501 generates a tag message including the tag identifier encoded therein, transmitting the tag message to the reader at step 1025. The reader receives tag messages from one or more tags 310 within an operating range at step 1030, and determines the tag identifiers associated with these messages at step 1035.

Having detected the tags 310, at step 1040, the reader transmits sleep messages to each of the detected tags. In particular, the sleep messages will be addressed to each of the detected tags 310, for example by including the tag identifier in message header, or by establishing a paired connection with the respective tag upon receipt of the tag message. The tags receive the sleep messages at step 1045, causing the tags 310 to enter the sleep mode for a set time at step 1050. Each tag will determine if the time period is expired at step 1055, and if not return to the sleep mode at step 1050, otherwise returning to step 1010 by entering the passive mode and awaiting further broadcast messages.

Thus, once a tag message is detected, the respective tag is put into a sleep mode, allowing other tags within range of the tag reader 320 to be detected. As previously explained, this has benefits, including reducing the power used by the tag thereby prolonging battery life, as well as reducing the number of tag messages being transmitted by tags at any one time, thereby allowing a single reader to successfully detect a wider number of tags. However, it will also be appreciated that alternatively the sleep messages could be replaced by power off messages. This would typically occur at a facility when the article is exiting the transport network, and can be used to deactivate the tags when they no longer need to be tracked, thereby further reducing power usage.

In parallel with this, at step 1060 the reader transmits the tag identifier and tag reader identifier to the processing system 330. At step 1065, the processing system 330 determines an article identity utilising the tag identifier and the association data, before determining the article location using the tag reader identifier at step 1070.

Having determined the article location, the processing system 330 will typically store tracking data at step 1075, the tracking data including an indication of the article location together with other related information, such as the time and date. It will be appreciated that this can be used to establish an audit trail, showing the time and location of the article as the article is transported through different facilities within a transport network.

Once the tracking data has been stored, the processing system 330 can use the tracking data to generate representations at step 1080, which are then displayed to users via the client devices at step 1085, allowing users to visualise the location of articles within the transport network environment.

It will be appreciated that different types of representations could be generated as required, and these could be accessed via a central portal, such as a dashboard or similar. This would typically allow the user to specify details of articles of interest, and/or a required representation, with this being generated by having the processing system 330 query the tracking data and generate the representation in accordance with a defined template, as will be appreciated by persons skilled in the art.

Figure 11A:
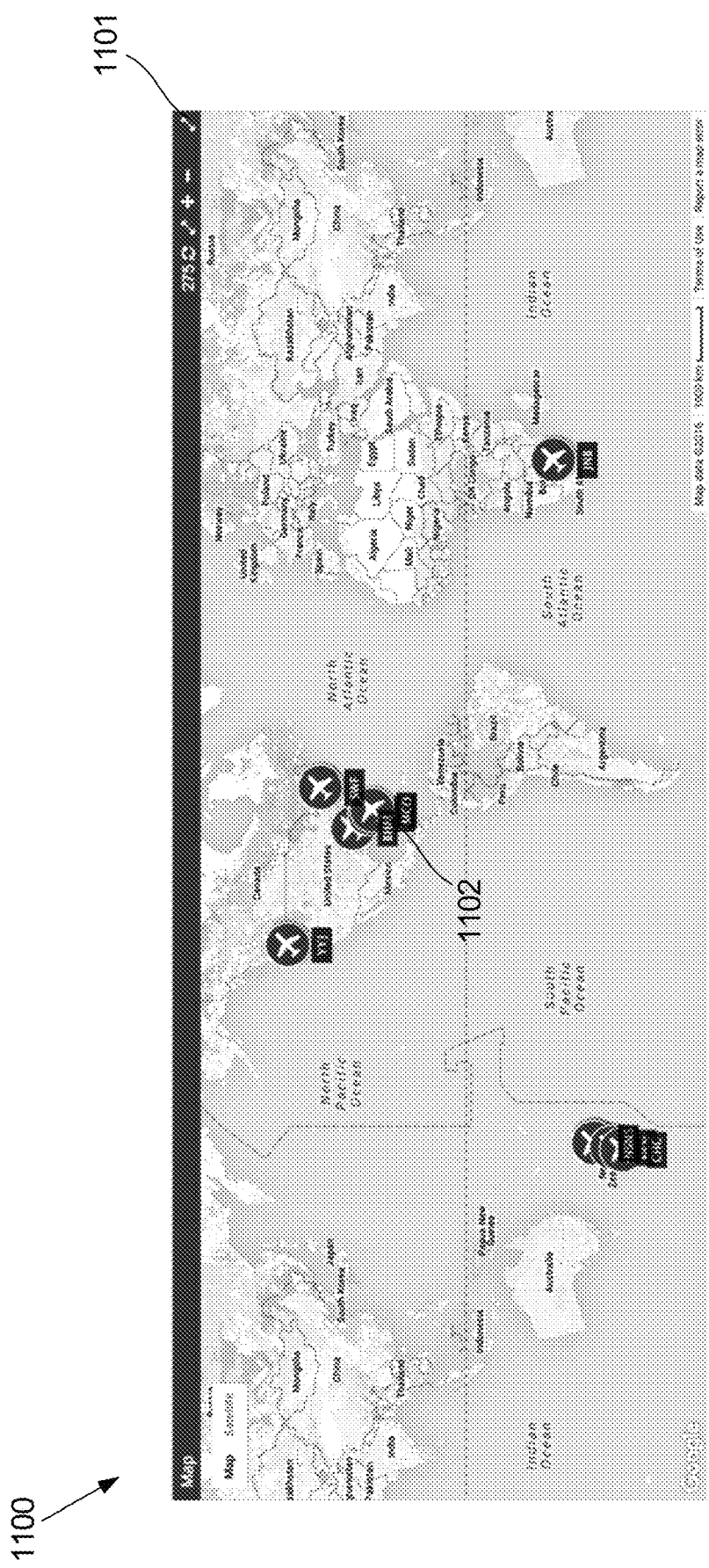
Figure 11B:
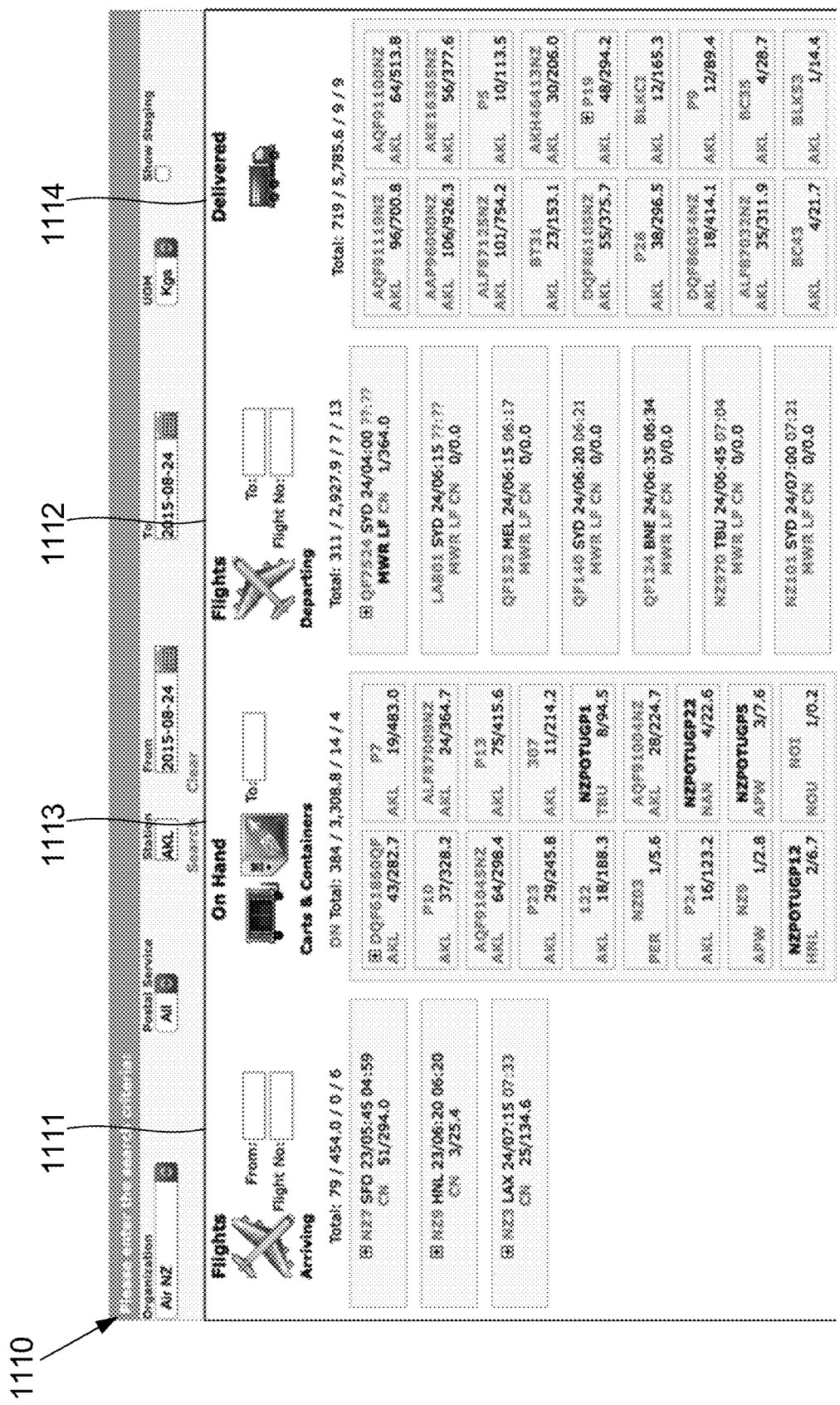
Figure 11C:
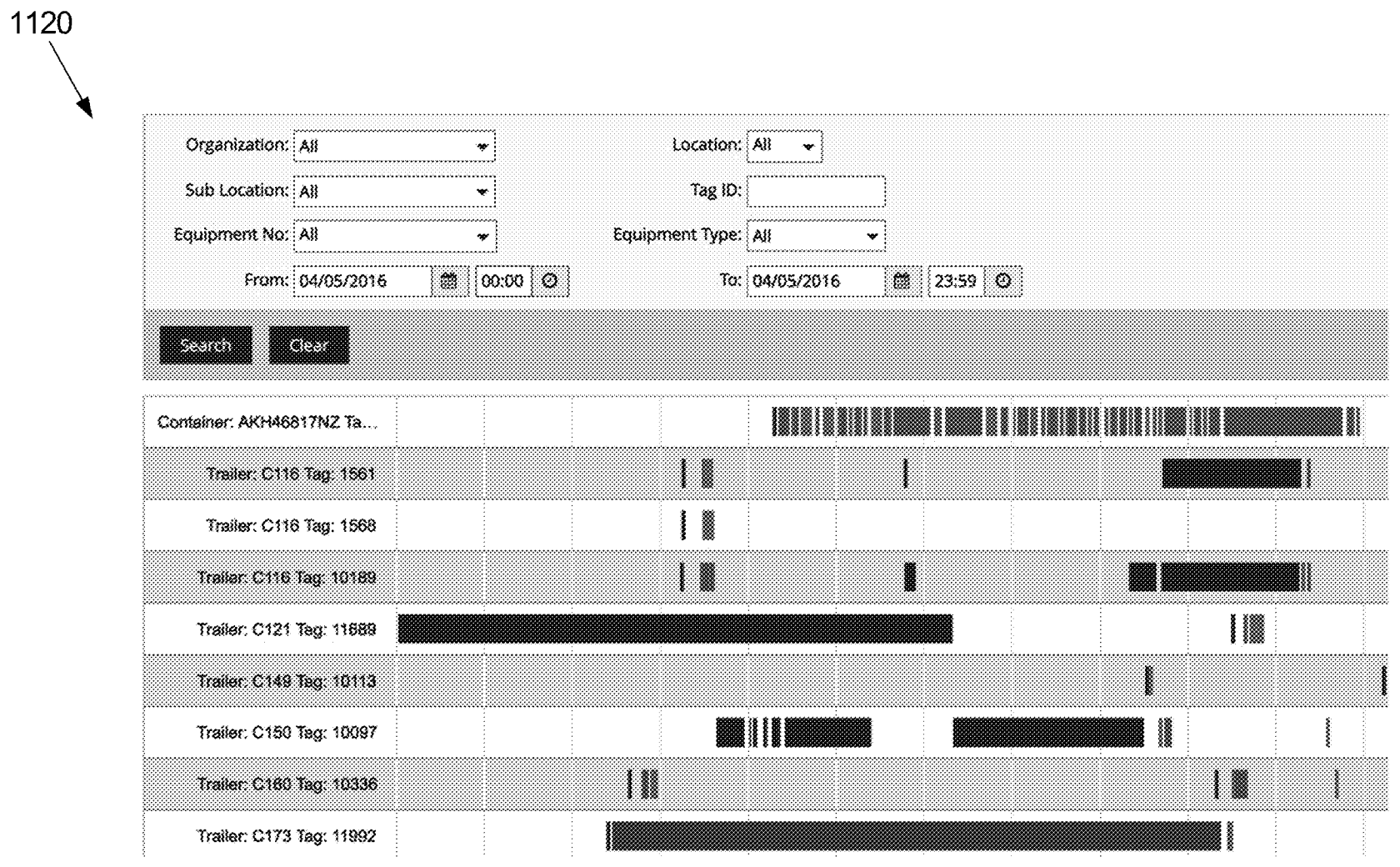

Example representations are shown in FIGS. 11A to 11C.

In the example of FIG. 11A a representation 1100 is presented including a live map 1101, which shows a map of a geographical area of interest, including indicia 1102 indicative of locations of tag readers. By selecting a location, users can be presented with summary information specifying details of containers and/or articles in the selected location.

In the example of FIG. 11B, the representation 1110 shows details of the transport network, including details of flights arriving 1111 and departing 1112 a location, intermediate routing of containers 1113 or the like between respective the flights and subsequent transfer to vehicle 1114 for delivery, with details of flights and/or containers being shown as appropriate. If selected, these can be expanded to show the content of the containers, including the respective articles therein. In this regard, it will also be appreciated that in this example, tags could be provided on individual articles, as well as containers, so that movement of containers and individual articles can be tracked. By identifying corresponding movement of articles and containers, this allows associations between respective articles and containers to be automatically determined. Accordingly, this allows the system to be used to identify the relative position of articles within the transport network.

It will be appreciated that recording associations between containers and individual articles allows users to ensure articles remain within the containers during transit by comparing the readings of the respective tags. These tools therefore allow users to more readily identify fraudulent acts, such as attempts to access or otherwise tamper with articles, as well as to locate misplaced articles.

In the example, of FIG. 11C, the representation 1120 shows information regarding specific containers and their associated tags, including an indication of the operating modes of the tags. This allows users to view when the tags were in facilities and in transit.

Thus, storing the tracking data allows the movement of articles within a transport network to be queried and analysed. This can allow the flow of articles through the transport network to be analysed, thereby identifying bottlenecks, or areas in which articles are more frequently mislaid or misdirected. This allows corresponding improvements to be made in the manner in which the transport network operates, as well as allowing fraudulent activity to be identified and addressed.

Figure 12A:
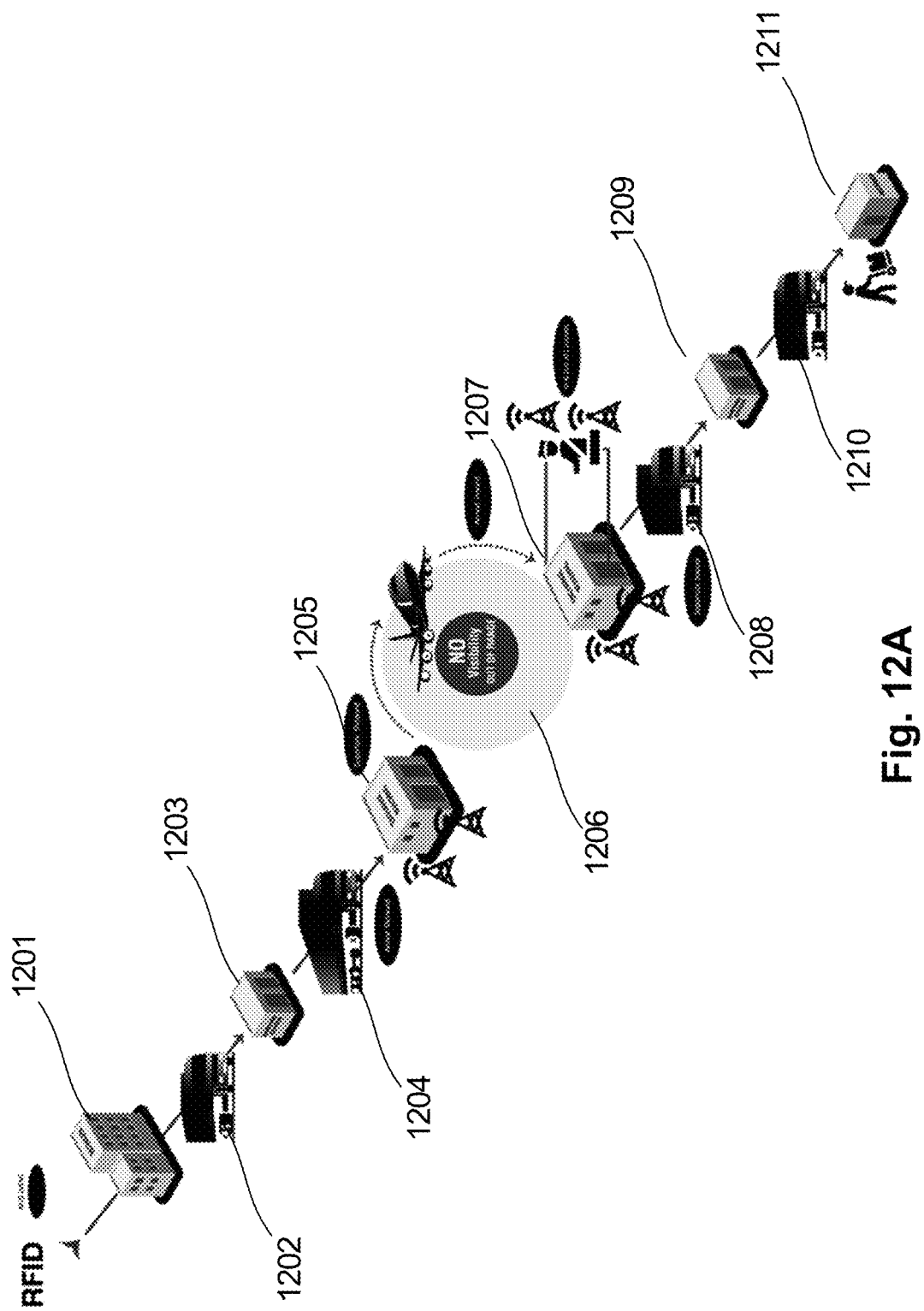
FIG. 12A is a schematic diagram of an example of a method of tracking articles in a transport network using an RFID tracking arrangement.
Figure 12B:
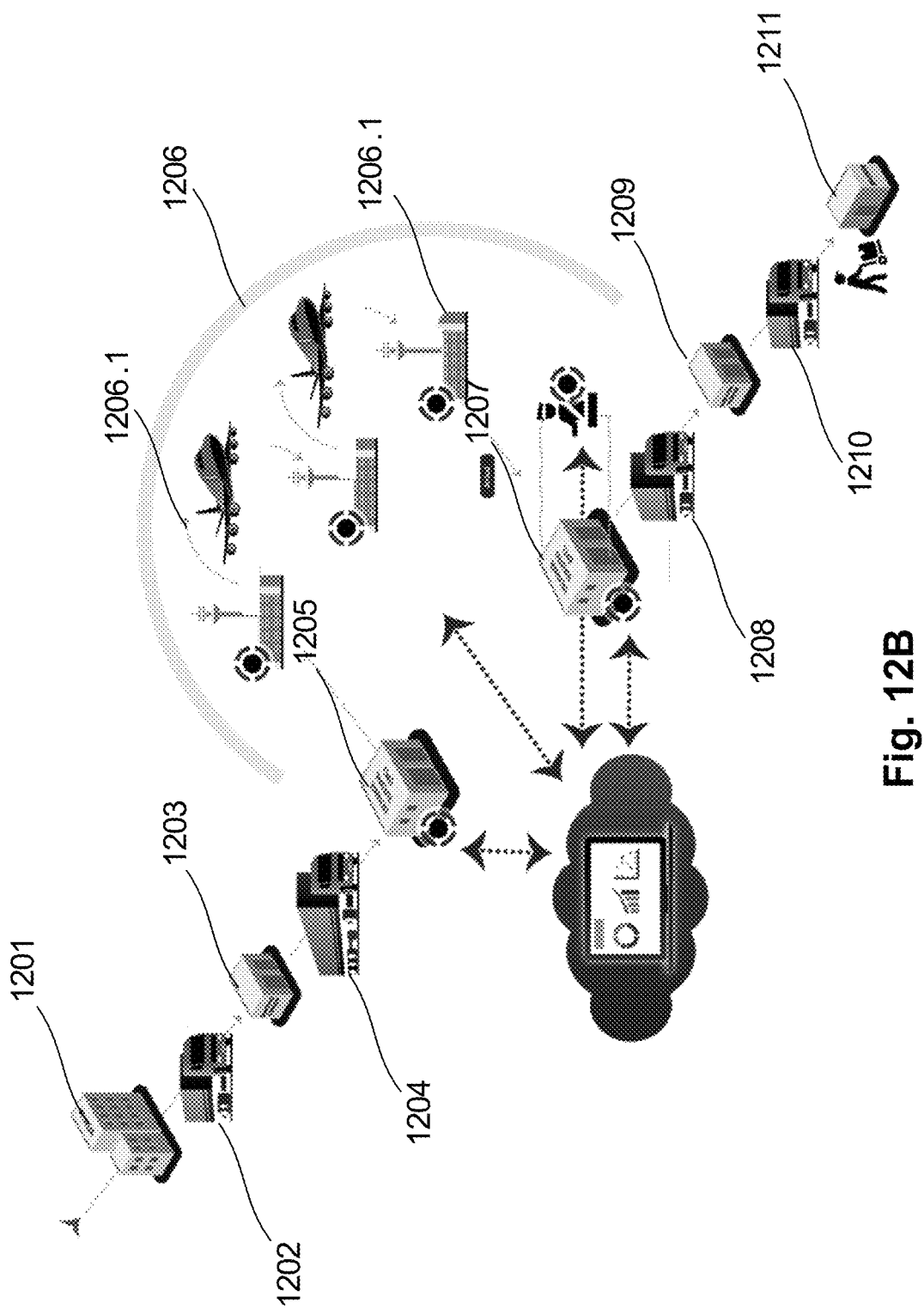
FIG. 12B is a schematic diagram of a comparative example of a Bluetooth tracking arrangement.
Figure 13A:
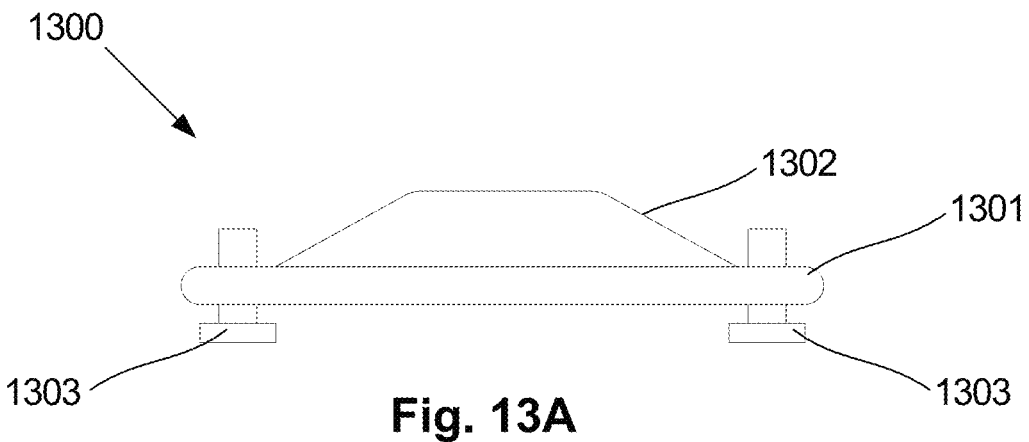
FIG. 13A is a schematic plan view of an example of a tag housing.
Figure 13B:
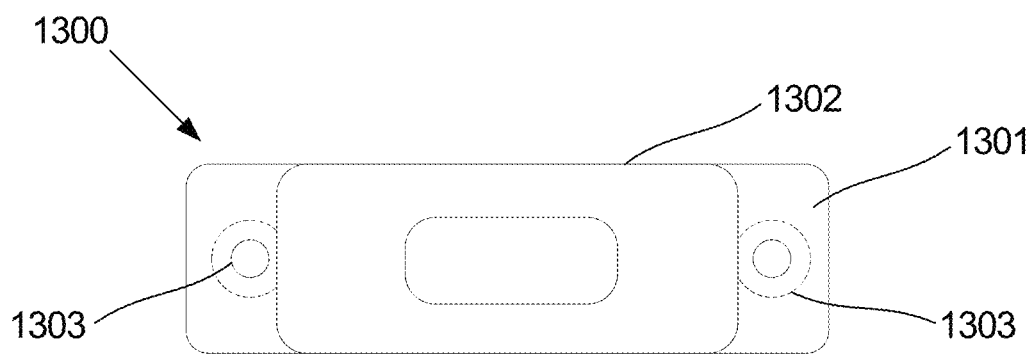
FIG. 13B is a schematic side view of the tag housing of FIG. 13A.
Figure 13C:
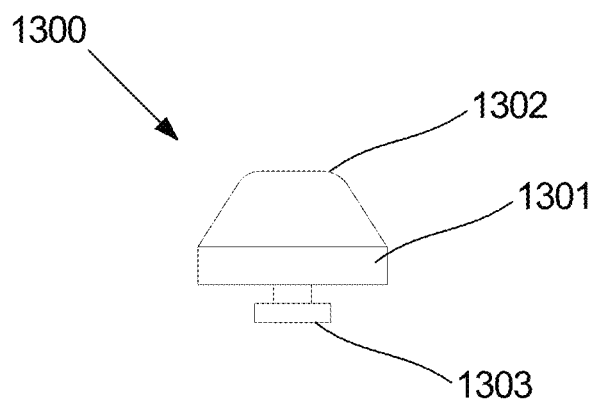
FIG. 13C is a schematic end view of the tag housing of FIG. 13A.
Figure 13D:
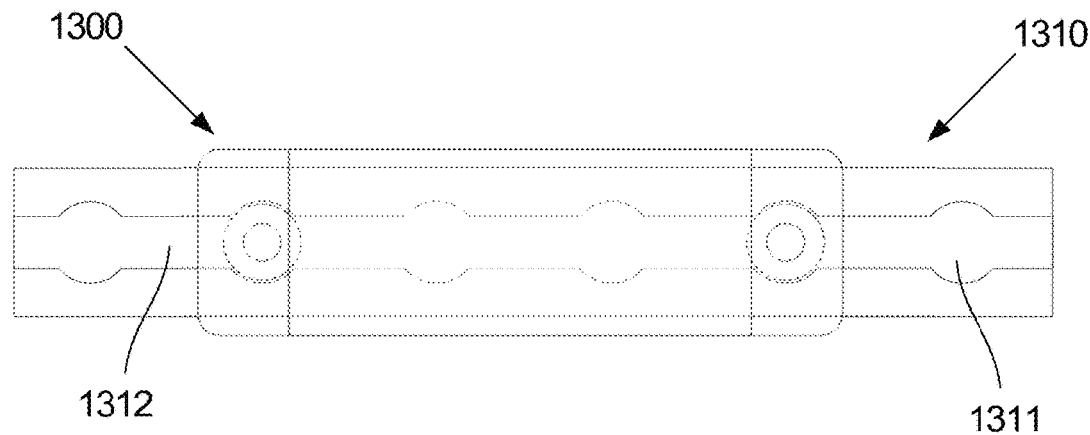
FIG. 13D is a schematic plan view of the tag housing of FIG. 13A during attachment to a rail.
Figure 13E:
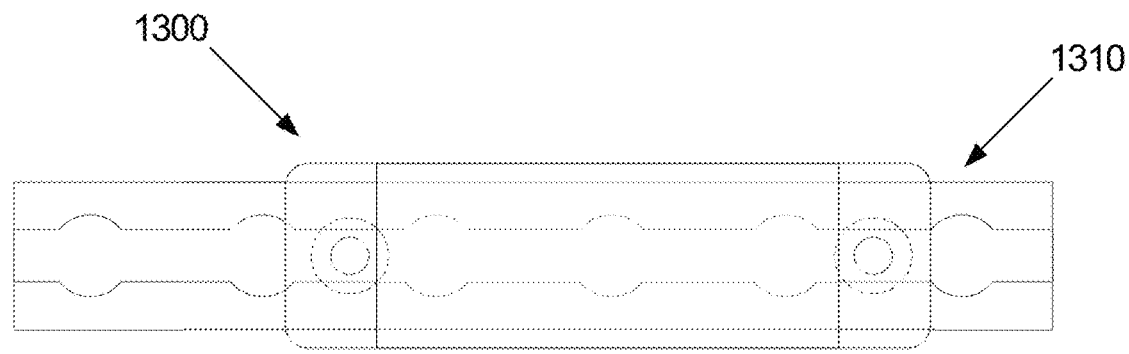
FIG. 13E is a schematic plan view of the tag housing of FIG. 13A attached to a rail.
Figure 13F:
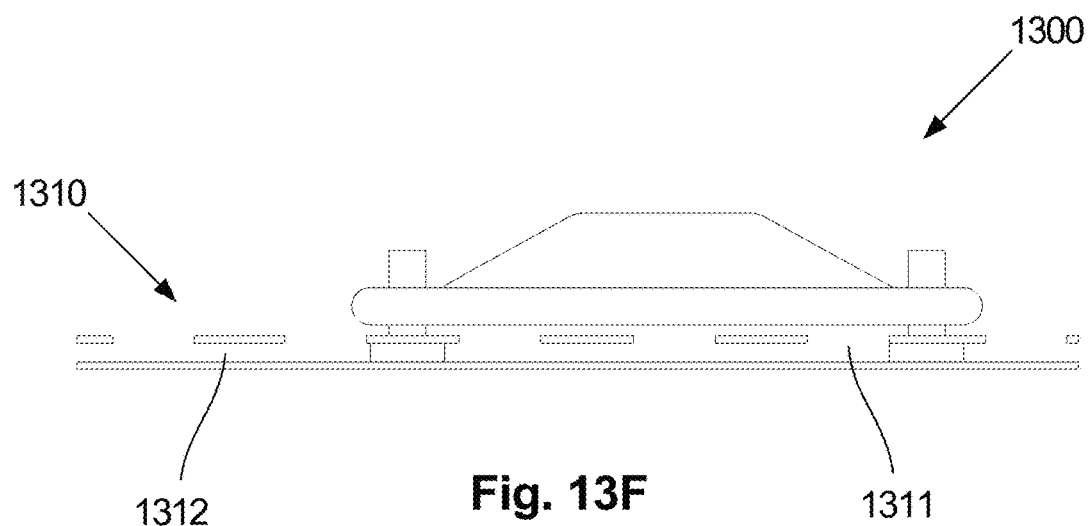
FIG. 13F is a schematic side view of the tag housing of FIG. 13A attached to a rail.
Figure 14A:
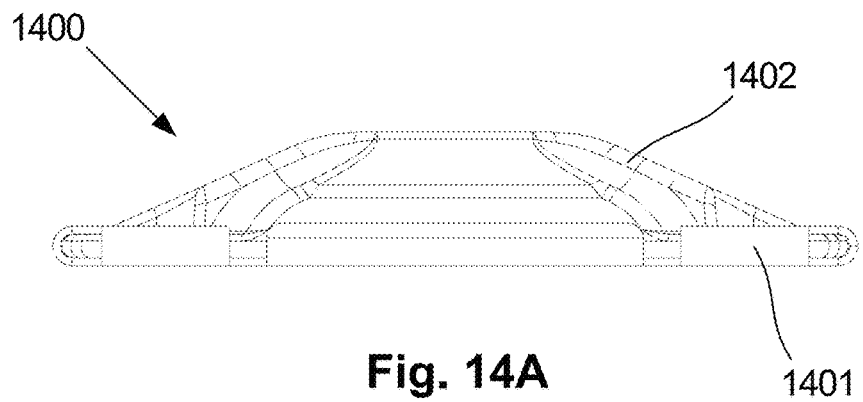
FIG. 14A is a schematic plan view of an example of a tag housing.
Figure 14B:
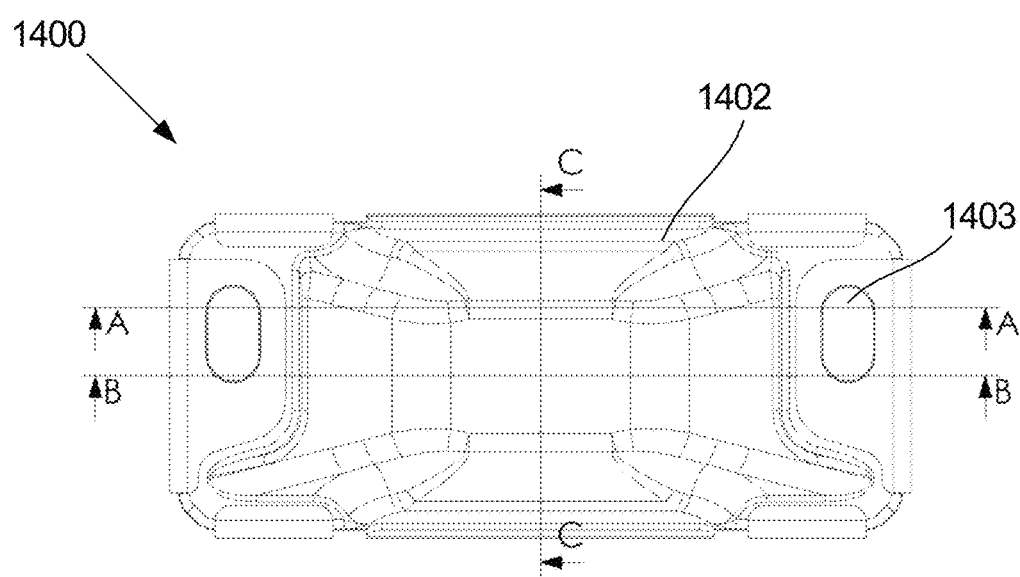
FIG. 14B is a schematic side view of the tag housing of FIG. 14A.
Figure 14C:
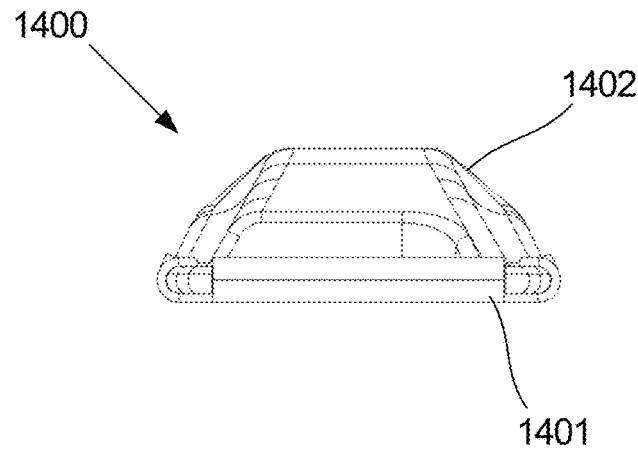
FIG. 14C is a schematic end view of the tag housing of FIG. 14A.
Figure 14D:
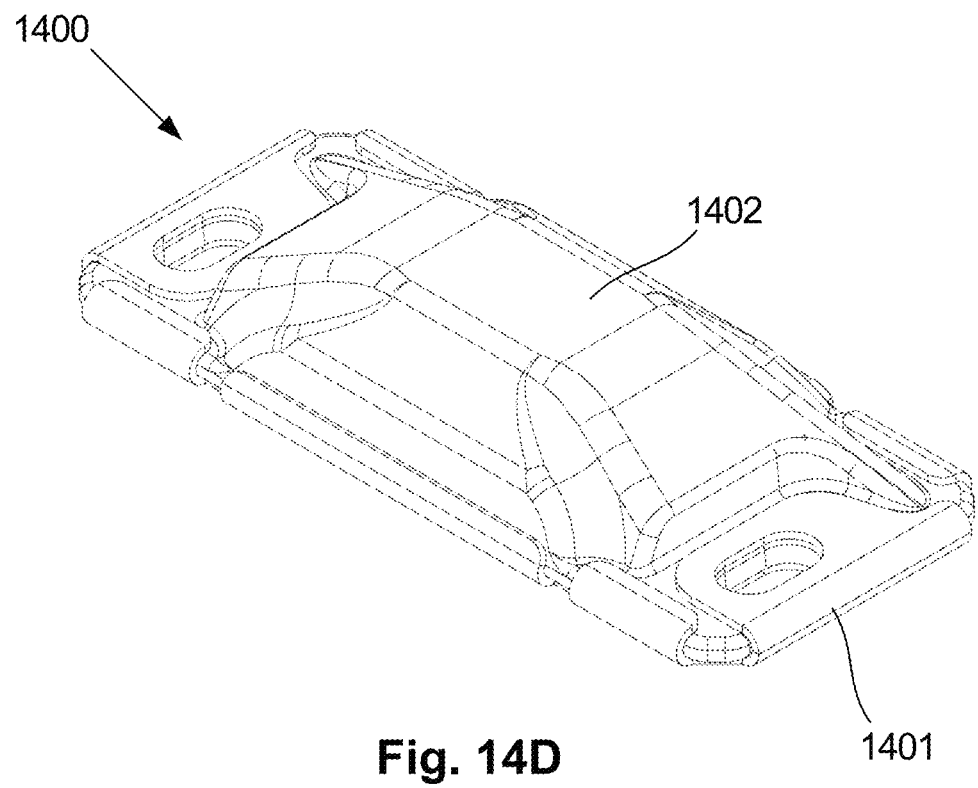
FIG. 14D is a schematic perspective topside view of the tag housing of FIG. 14A.
Figure 14E:
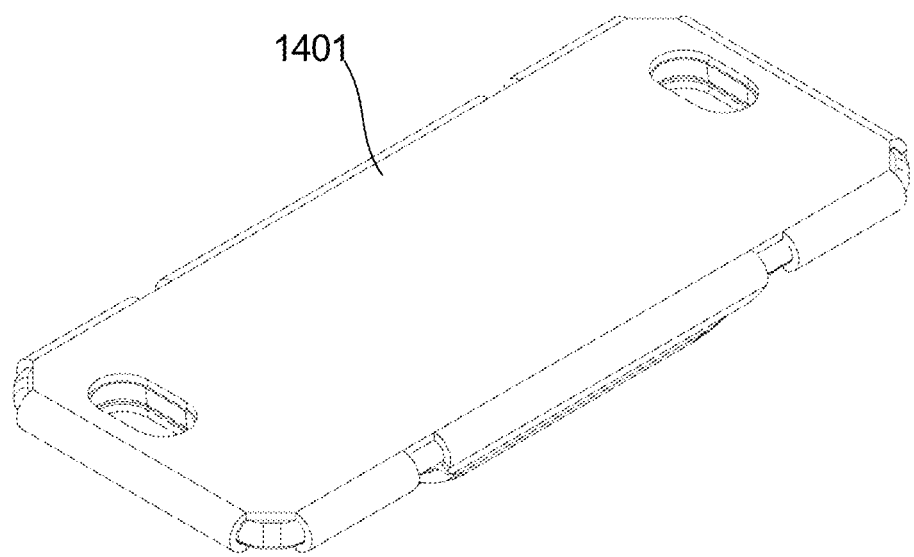
FIG. 14E is a schematic perspective underside view of the tag housing of FIG. 14A.
Figure 14F:
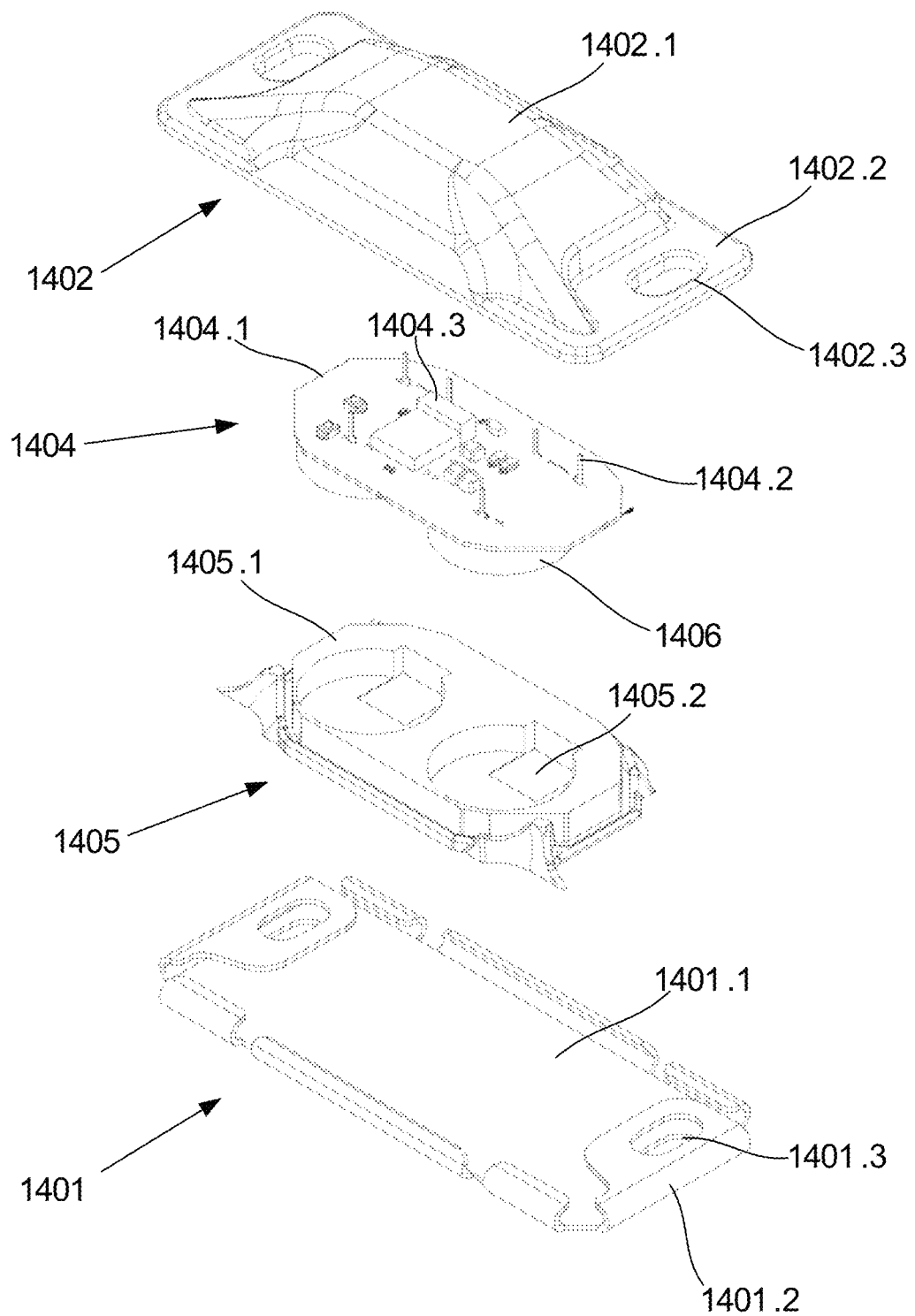
FIG. 14F is a schematic perspective exploded view of the tag housing of FIG. 14A.
Figure 14G:
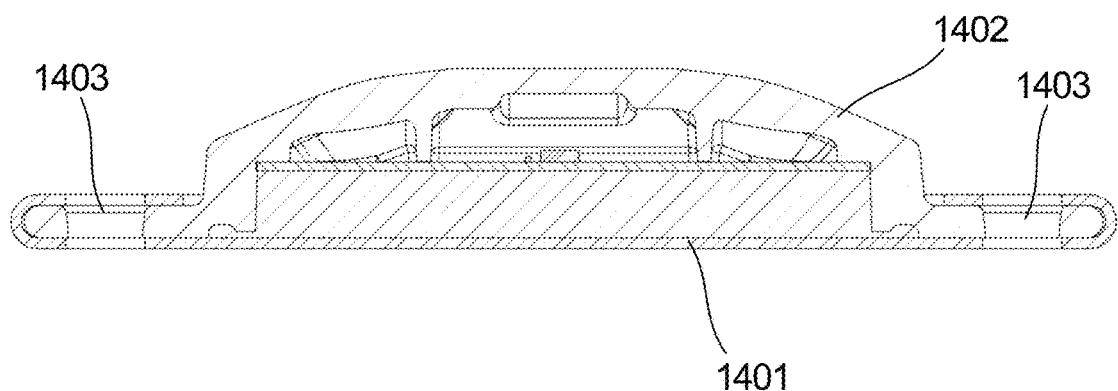
FIG. 14G is a schematic cross sectional view along the line A-A' of FIG. 14B.
Figure 14H:
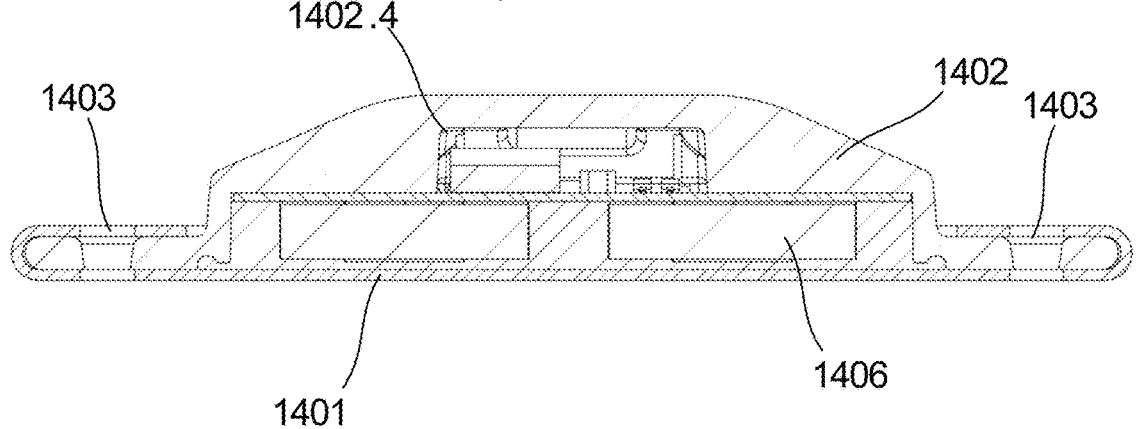
FIG. 14H is a schematic cross sectional view along the line B-B' of FIG. 14B.
Figure 14I:
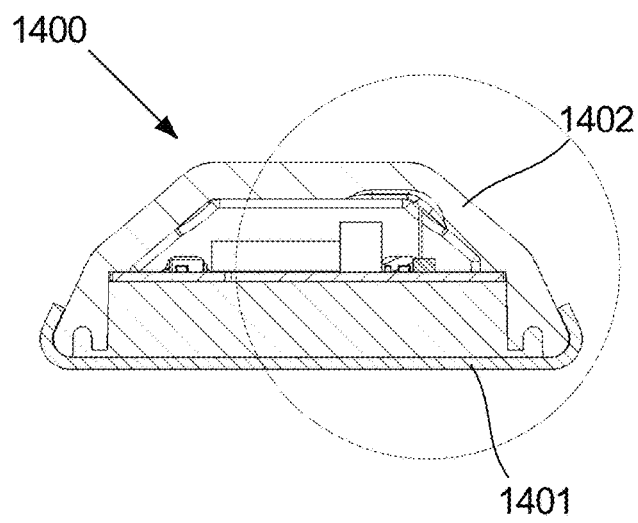
FIG. 14I is a schematic cross sectional view along the line C-C' of FIG. 14B; and, FIG. 14J is a schematic close up view of the detail of FIG. 14I.
Figure 14J:
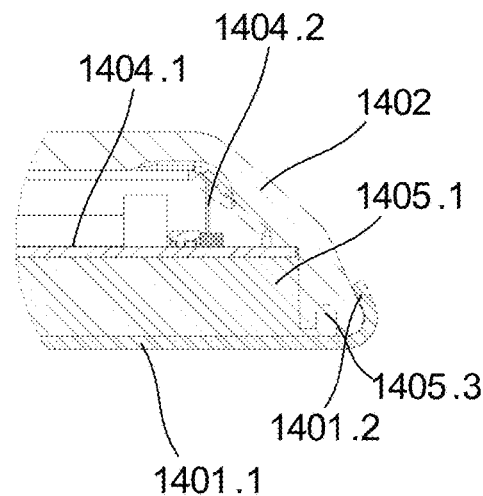

A comparative analysis of RFID tracking, and tracking using the approaches described herein, will now be described with reference to FIGS. 12A and 12B.

For the purpose of this example, it is assumed articles are being transported internationally from a retailer's facility to an end customer in a different country, and this is particularly useful in highlighting deficiencies in existing systems.

In this example, it is usual for the articles to be dispatched from the retailer facility 1201 and transported via road vehicles 1202, 1204 and one or more intermediate depots 1203, to an exchange building 1205, where the articles are sorted for subsequent transport via an air transfer network 1206. The articles are delivered to an arrivals and sorting depot 1207, typically including custom facilities, before being transported via road vehicles 1208, 1210 and one or more intermediate depots 1209, to a customer 1211.

In the case of traditional RFID tracking systems, an RFID tag is attached to the article, allowing this to be tracked at specific locations through the network. However as RFID is typically a short range protocol, this requires multiple readers at respective locations in order to be able to track the articles. For example, typically six readers are required in order to provide adequate coverage at the exchange building 1205 and the arrivals depot 1207 only. The articles are untracked throughout the remainder of the transport network, and the air transfer network 1206.

In contrast, in the example of the current system, a reduced number of tag readers 320 can be provided at each location, meaning six tag readers are sufficient to cover the exchange building 1205 and the arrivals depot 1207, as well as up to three intermediate transfer facilities 1206.1 within the air transfer network 1206. This provides a greater resolution to the tracking process, reducing parts of the network where tracking is not performed, hence improving the reliability and accuracy of tracking and helping to reduce losses and fraud within the transport network. Additionally, by virtue of the fact that tags can be readily reused over long periods of time, which is not typically the case with RFID tags, this allows tracking to be performed with a comparative or lower cost.

Accordingly, the above described system uses tags and tag readers that communicate using a short range wireless protocol such as BLE. The system uses management of the tag operation in order to control power usage, enabling the tags to have a long life whilst using minimal batteries, allowing the tags to remain lightweight and suitable for use with a wide range of articles. Management is also utilised in order to reduce superfluous tag to tag reader communication, by causing the tags to enter a sleep mode, thereby increasing the number of tags that can be read by a single tag reader, thereby improving the effectiveness of the process, whilst reducing the number of tag readers required to a viable level.

Communication between tags and tag readers can be configured using encoded messages, thereby reducing the ability of third parties to intercept messages and hence fraudulently control or manipulate tags and tag read events, thereby increasing security. Tag readers are configured to communicate directly with a centralised processing system via a cellular network, reducing the need for external interfaces, which can be used to gain access to the tag reader, and avoiding the need for additional infrastructure in facilities in which readers are installed.

Tracking of articles can be performed centrally by the processing system, allowing users to easily access information regarding the location of articles throughout a transport network, or other supply chain. This can include providing representations indicative of articles and their journey through the transport network, allowing fraudulent activities to be readily identified, as well as allowing lost articles to be easily found and retrieved.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. An article tracking system including:
    a) a plurality of tags, each tag being attachable to a respective article and including:
        i) a power supply;
        ii) a tag transceiver configured to transmit or receive messages; and
        iii) a tag processing device;
    b) tag reader including:
        i) a reader transceiver that transmits or receives messages; and
        ii) a reader processing device in communication with the reader transceiver; and,
    c) a processing system in communication with the tag reader, and wherein in use the tag reader:
        i) generates a message; and
        ii) transmits the message to one or more tags within an operating range of the tag reader, wherein ones of the one or more tags in a passive operating mode are responsive to the message to:
            (1) receive the message in the passive operating mode;
            (2) enter an active operating mode from the passive operating mode; and
            (3) while in the active operating mode, transmit a tag message at least partially indicative of an identity of the tag;
        iii) receives any tag messages;
        iv) generates location data at least partially indicative of a location of at least one tag using the identity of the at least one tag from any received tag messages; and,
        v) provides the location data to the at least one processing system, the at least one processing system being responsive to the location data to track respective locations of articles, wherein a respective tag of the plurality of tags comprises:
            (1) a base;
            (2) a cover attached to the base to define an internal cavity containing tag components; and
            (3) bolts secured to opposing ends of the base to allow the respective tag to be coupled to a rail.

2. An article tracking system according claim 1, wherein in response to a power message, the tag processing device enters a power off operating mode by deactivating the power supply.

3. An article tracking system according to claim 1, wherein at least one of:
    a) the tag message includes:
        i) a tag identifier indicative of the identity of the tag; and
        ii) at least one of:
            (1) a power supply indicator indicative of a power supply status; or
            (2) a temperature indicator indicative of a maximum and minimum temperature to which the tag has been exposed between interactions with a tag reader;
    b) the tag transceiver is a Bluetooth transceiver; or
    c) the tag further includes a passive RFID tag.

4. An article tracking system according to claim 1, wherein the tag is labelled with information including at least one of:
    a) machine readable coded data indicative of a tag identifier;
    b) coded data indicative of the identity of the tag; or c) visible markings indicative of the identity of the tag.

5. An article tracking system according to claim 1, wherein:
    a) the base includes a flat laminar metal plate bent to form a base lip extending at least part way around a perimeter of the base; and
    b) the cover includes a cover body that when coupled to the base defines a cavity that contains tag components, the cover body including a tongue extending laterally around at least part of a perimeter of the cover body that engages with the base lip to secure the cover to the base.

6. An article tracking system according to claim 5, wherein apertures extend perpendicularly through the base lip and tongue at opposing ends of the flat laminar metal plate to define bolt openings adapted to receive the bolts.

7. An article tracking system according to claim 5, wherein the cover is at least one of:
a) shaped to deflect impacts; or
b) made from at least one of:
  i) a plastic; or
  ii) a Polycarbonate/Polybutyleneterephthalate mix.

8. An article tracking system according to claim 5, wherein the tag includes a circuit board supporting electronic components and a battery housing, the battery housing including one or more recesses for receiving batteries and a ridged lip extending laterally outwardly from a lower edge of the battery housing body that sits in a recess in an underside face of the cover to thereby provide sealing engagement.

9. An article tracking system according to claim 1, wherein
the reader processing device causes the reader transceiver to transmit a power message to cause the tag to enter a power off operating mode.

10. An article tracking system according to claim 1, wherein at least one of:
a) the processing system at least one of:
  i) stores tracking data including an indication of the respective locations of articles; or
  ii) generates a representation including an indication of a location of the respective article, and the representation includes at least one of:
    (1) a map showing the location of the respective article; or
    (2) one of a number of visual indicia, the visual indicia being selected at least partially in accordance with the location; or
b) the tag reader is provided at a transit location within a transport network.

11. An article tracking system according to claim 1, wherein the reader transceiver:
a) receives the tag message;
b) determines the identity of the tag from the tag message; and
c) provides a reader message to the reader processing device, the reader message being indicative of the identity of the tag, the reader processing device being responsive to the reader message to cause the reader transceiver to generate a sleep message in accordance with the identity of the tag.

12. An article tracking system according to claim 1, wherein the tag reader includes a plurality of reader transceivers that transmit or receive messages in parallel.

13. An article tracking system according to claim 1, wherein at least one of:
a) the reader processing device:
  i) generates commands to cause the reader transceiver to generate messages; and
  ii) provides the location data to the processing system via a cellular communications network; or
b) the location data includes an indication of:
  i) a reader identifier indicative of an identity of the tag reader; and
  ii) a tag identifier indicative of the identity of the tag, and wherein the processing system:
    (1) determines a reader location using the reader identifier; and
    (2) determines an article identifier indicative of an identity of the respective article using the tag identifier and association data, the association data being indicative of an association between the article identifier and the tag identifier.

14. An article tracking system according to claim 13, wherein at least one of the article identifier or the tag identifier is determined by a scanner that scans machine readable coded data provided on at least one of the respective article or the tag.

15. An article tracking system according to claim 1, wherein a sleep message is generated by the tag reader in response to receipt of the tag message and the tag reader transmits the sleep message to the one or more tags to cause the one or more tags to enter a sleep operating mode, and wherein, when in the sleep operating mode, the one or more tags do not respond to subsequent messages for a defined time period.

16. An article tracking system according to claim 15, wherein, after remaining in the sleep operating mode for the defined time period, the one or more tags return to the passive operating mode.

17. A method of tracking an article using an article tracking system including:
a) a plurality of tracking tags, each tracking tag being attachable to an article and comprising:
  (1) a base;
  (2) a cover attached to the base to define an internal cavity containing tag components; and
  (3) bolts secured to opposing ends of the base to allow the respective tag to be coupled to a rail;
b) tag reader; and
c) a processing system in communication with the tag reader, the method including:
  i) in the tag reader:
    (1) generating a broadcast message;
    (2) transmitting the broadcast message to one or more tracking tags of the plurality of tracking tags, wherein the one or more tracking tags are within an operating range of the tag reader, and wherein at least one tracking tag of the plurality of tracking tags is, when in a passive operating mode, responsive to the broadcast message to:
      (a) receive the broadcast message in the passive operating mode, wherein the at least one tracking tag does not transmit messages in the passive operating mode;
      (b) enter an active operating mode from the passive operating mode; and
      (c) while in the active operating mode, transmit a tag message at least partially indicative of an identity of the tag; and
    (3) generating location data at least partially indicative of a location of the at least one tracking tag; and
  ii) in the processing system:
    (1) obtaining the location data; and
    (2) using the location data to track the location of the article.

18. The method of tracking the article according to claim 17, wherein a reader transceiver of the tag reader:
a) receives the tag message;
b) determines the identity of the tag from the tag message; and,
c) provides a reader message to a reader processing device of the tag reader, the reader message being indicative of the identity of the tag, the reader processing device being responsive to the reader message to cause the reader transceiver to generate a sleep message in accordance with the identity of the tag.

19. The method of tracking the article according to claim 17, further comprising:

iii) in the at least one tracking tag:
  (1) receiving a sleep message from the tag reader, wherein the sleep message is generated by the tag reader in response to receipt of the tag message; and
  (2) entering a sleep operating mode for a defined time period in response to receiving the sleep message, wherein, while in the sleep operating mode, the at least one tracking tag at least one of:
    (a) does not respond to subsequent broadcast messages; or
    (b) does not receive the subsequent broadcast messages.

20. An article tracking system including:
a) a plurality of tags, each tag being attached to a respective article in use and including:
  i) a power supply;
  ii) a tag transceiver that transmits or receives messages; and
  iii) a tag processing device;
b) a number of tag readers, each tag reader including:
  i) at least one reader transceiver that transmits or receives messages; and,
  ii) a reader processing device in communication with the at least one reader transceiver; and,
c) at least one processing system in communication with the number of tag readers, and wherein in use each tag reader:
  i) generates a message; and,
  ii) transmits the message to one or more tags within an operating range of the tag reader, wherein ones of the one or more tags in a passive operating mode are responsive to the message to:
    (1) receive the message;
    (2) selectively change a tag operating mode; and,
    (3) transmit a tag message at least partially indicative of an identity of the tag;
  iii) receives any tag messages;
  iv) generates location data at least partially indicative of a location of at least one tag using the identity of the at least one tag from any received tag messages; and,
  v) provides the location data to the at least one processing system, the at least one processing system being responsive to the location data to track respective locations of articles, and wherein a respective tag of the plurality of tags comprises:
    (1) a base;
    (2) a cover attached to the base to define an internal cavity containing tag components; and
    (3) bolts secured to opposing ends of the base to allow the respective tag to be coupled to a rail mounted on a unit loading device.

* * * * *